United States Patent
Nabi

(10) Patent No.: US 11,294,063 B2
(45) Date of Patent: Apr. 5, 2022

(54) SYSTEM AND METHOD FOR FAST WIND FLOW MEASUREMENT BY LIDAR IN A COMPLEX TERRAIN

(71) Applicant: Mitsubishi Electric Research Laboratories, Inc., Cambridge, MA (US)

(72) Inventor: Saleh Nabi, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 16/838,155

(22) Filed: Apr. 2, 2020

(65) Prior Publication Data

US 2021/0311196 A1 Oct. 7, 2021

(51) Int. Cl.
*G01S 17/95* (2006.01)
(52) U.S. Cl.
CPC .................................... *G01S 17/95* (2013.01)
(58) Field of Classification Search
CPC ....................................................... G01S 17/95
See application file for complete search history.

(56) References Cited

U.S. PATENT DOCUMENTS

| | | | | |
|---|---|---|---|---|
| 5,724,125 A * | 3/1998 | Ames | ...................... | G01S 17/58 356/28.5 |
| 7,948,104 B2 * | 5/2011 | Andersen | .............. | F03D 7/0264 290/44 |
| 2015/0039228 A1 * | 2/2015 | Wang | ...................... | G01W 1/00 702/3 |

(Continued)

FOREIGN PATENT DOCUMENTS

WO WO 2014/096419 * 6/2014 ............... F03D 7/02

OTHER PUBLICATIONS

M. Boquet et al., "Combination of Wind Lidar with CFD tools for improving measurements in complex terrain", Centre Scientifique d'Orsay, Plateau du Moulon, 91400 Orsay, France-ARIA Technologies, 8-10 rue de la Ferme, 92100 Boulogne-Billancourt, France, Jan. 2010, 4 p.*

(Continued)

*Primary Examiner* — Alexander Satanovsky
(74) *Attorney, Agent, or Firm* — Gennadiy Vinokur; Hironori Tsukamoto

(57) ABSTRACT

A wind flow sensing system for determining wind flow at a set of different altitudes above a terrain is provided, The wind flow sensing system comprises an input interface configured to receive a set of measurements of radial velocities at line-of-site points above the terrain for each of the altitudes, and a processor configured to estimate velocity fields for each of the altitudes based on data assimilation of the velocity fields above an approximation of the shape of the terrain with a set of one or multiple convex shapes to fit the measurements of radial velocities and estimate horizontal velocities at each of the altitudes as a horizontal projection of the corresponding radial velocities corrected with corresponding horizontal derivatives of vertical velocities of the estimated velocity fields. The wind flow sensing system further comprises an output interface configured to render the estimated horizontal velocities at each of the altitudes.

13 Claims, 34 Drawing Sheets

(56) References Cited

U.S. PATENT DOCUMENTS

2020/0400836 A1* 12/2020 Nguyen .................. G01S 17/58

OTHER PUBLICATIONS

Kim et al., "Correction of LiDAR measurement error in complex terrain by CFD: Case study of the Yangyang pumped storage plant", Wind Engineering, 2017, vol. 41(4) 226-234.*

M. Harris et al., "Validated adjustment of remote sensing bias in complex terrain using CFD", 2010, 7 p.*

* cited by examiner

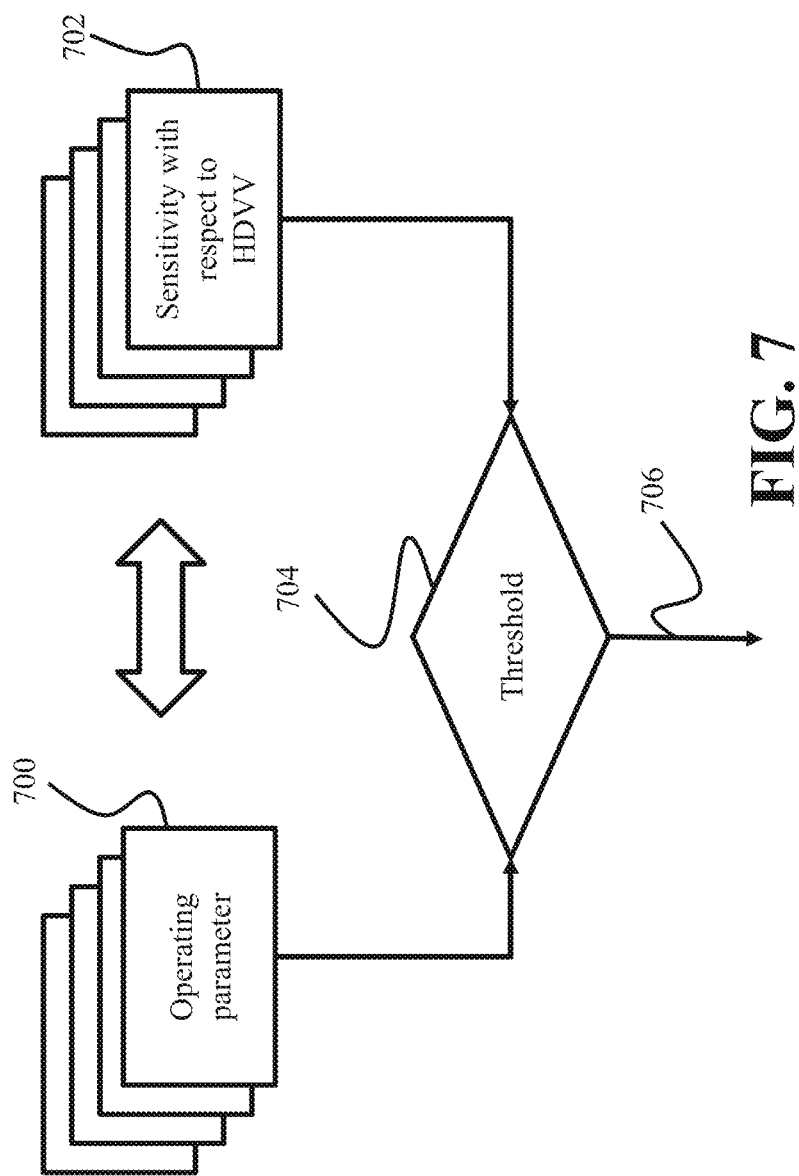

SYSTEM AND METHOD FOR FAST WIND FLOW MEASUREMENT BY LIDAR IN A COMPLEX TERRAIN

TECHNICAL FIELD

This invention relates generally to remote sensing, and more specifically to a wind flow sensing system and method for fast wind flow measurement by LiDAR in a complex terrain.

BACKGROUND

Measurement of wind flow is important for many applications, such as meteorology and for the monitoring and characterization of sites such as airports and wind farms. It is often useful to measure the displacement of air masses over a wide range of altitudes or in a zone corresponding to an extensive volume. Sensing of such a displacement of an extensive volume can be impractical to perform with anemometers such as cup anemometers, and requires remote sensing instruments, capable of taking remote measurements. These instruments in particular include radar, LiDAR and SODAR. Radar and LiDAR systems use electromagnetic waves, in hyper frequency and optical frequency ranges respectively. SODAR systems use acoustic waves. For example, for the measurements of the of air masses/wind flow, the instrument transmits one or more beams of waves (acoustic and/or electromagnetic) along transmission axes in the zones to be measured, continuously or as pulses. The transmissions along the different transmission axes can be simultaneous or sequential.

The beams are subjected to scattering effects in the atmosphere, due in particular to the inhomogeneities encountered (aerosols, particles, variations in refractive indices for electromagnetic waves or in acoustic impedance for acoustic waves). When they are scattered in air masses or moving particles, these beams of waves also undergo a frequency shift by Doppler effect. The backscattered beams are detected by one or more receivers oriented according to measurement axes. The one or more receivers detect the waves scattered by the atmosphere in their direction along their measurement axis. The distance along the measurement axis of the detectors at which scattering occurred can then be calculated, for example by a method of measuring the time of flight, or a method of phase shift measurement by interferometry. The radial velocity of the air masses or particles along the measurement axis can also be obtained by measuring the frequency shift of the wave by the Doppler effect. This measured radial velocity corresponds to the projection of the velocity vector of the scattering site on the measurement axis of the detector.

In particular, LiDAR systems suitable for measuring the characteristics of the wind in the lower layers of the atmosphere are often of monostatic type. This signifies that the same optics or the same antenna (acoustic or electromagnetic) is used for transmission and for reception of the signal. The volume probed is generally distributed along a cone with its apex located at the level of the optics or of the antenna of the instrument. Each beam of pulses of the instrument along the cone measures the radial velocity of movement of the particles along a measurement axis that coincides with the transmission axis. Thus, measurements of the radial velocity of the wind, representative of projection of wind vector on the beam propagation axis, are obtained. The wind vector, i.e., a velocity field, throughout all the volume of interest is then calculated, on the basis of the measurements of radial velocity of the wind.

In existing instruments, this calculation is generally carried out using purely geometric models. One shortcoming of these models is that they are based on a hypothesis that is sometimes rather unrealistic, in particular spatial and temporal homogeneity of the wind for whole duration of sample measurement. According to this hypothesis, at a given altitude the wind vector is identical at every point of the atmosphere probed by the instrument.

Using the spatial and temporal homogeneity of the wind, some methods, such as "Doppler Beam Swinging" (DBS) method, calculate the components of the wind vector at a given altitude from at least three measures of radial velocities measured at one and the same altitude in at least three different directions, by solving a system of at least three equations with the three unknowns that describes the geometric relationship between the wind vector and its projections along the axes of measurements constituted by the measurements of radial velocities. An example of a method using geometric calculation is a "Velocity Azimuth Display" (VAD) method. However, this method is based on the same hypotheses of spatial homogeneity of the wind at a given altitude.

The remote sensing instruments for wind measurement using geometric techniques for reconstruction of the wind vector allow accurate measurement of an average velocity of the wind when the measurement is carried out above essentially flat terrain (terrain with very little or no undulation, or offshore). For example, with LiDAR systems, relative errors obtained for measurements averaged over 10 minutes are under 2% relative to reference constituted by calibrated cup anemometers. On the other hand, accuracy of determination of horizontal and vertical velocity reduces considerably when the measurement is carried out above complex terrains such as undulating or mountainous terrains, terrains covered with forest, etc. A relative error for average values calculated over 10 minutes of the order of 5% to 10% was observed on the complex terrains, for measurements carried out with the LiDAR systems and relative to the calibrated cup anemometer.

Therefore, the instruments implementing the geometric models do not allow sufficiently accurate measurement of the horizontal and/or vertical velocity and direction of the wind over the complex terrain. In fact, over the complex terrains, the wind can no longer be considered as homogeneous at a given altitude in the volume of atmosphere probed by the instrument. However, accurate measurements the wind is useful under these conditions, in particular in the context of development of the wind farms.

Some methods use several different numerical models along with optimization techniques to match the radial flow velocities measured by LiDAR. However, determination of initial conditions or boundary conditions in such methods is cumbersome. Also, as the optimization techniques are iterative, the measurement of the wind turn into tedious process and is time consuming and computationally expensive such that the online wind reconstruction can become intractable.

Accordingly, there is still a need for a system and method suitable for the wind flow measurements over the complex terrains.

SUMMARY

It is an object of some embodiments to provide a wind flow sensing system and a wind flow sensing method for determining wind flow at a set of different altitudes above a terrain having a complex shape from a set of measurements of radial velocities at each of the altitudes. It is also an objective of some embodiments to estimate horizontal velocities at each of the altitudes. Additionally, it is an object of embodiments to estimate velocity fields for each of the altitudes based on data assimilation.

In some embodiments, remote sensing instruments, such as LiDAR is used for measuring characteristics of wind in atmosphere. The characteristics of the wind include wind velocity (horizontal and vertical velocity), turbulence, direction of the wind and the like. The LiDAR measures radial velocities of the wind in the line of sight (LOS) direction. However, horizontal velocity vector (magnitude and direction) is a parameter of interest. To that end, some embodiments are based on reconstruction of the wind from the measured radial velocities using geometrical relationships. Some embodiments are based on a recognition that the horizontal velocities are obtained by horizontal projection of the measured radial velocities. In practice, such a projection, which is based on homogenous assumption i.e. all LOS velocities correspond an identical horizontal velocity, is inaccurate as the measured radial velocities are different for different altitudes, and even for the same altitude LiDAR measures five different radial velocities having different values. Also, corresponding horizontal projections of the radial velocities do not consider fluctuation of velocities in vertical direction. Furthermore, such projection doesn't hold true for the wind flow over complex terrains such as hills, or near large building or other urban structures.

To that end, some embodiments are based on an objective of considering variation of velocities in the vertical direction (namely, vertical variation). Some embodiments are based on a realization that horizontal derivatives of vertical velocities can be used as correction on the horizontal projections of the measured radial velocities, to consider the vertical variation. In such embodiments, at first, the vertical velocities are determined by simulating velocity field of the wind flow to fit the measurements of radial velocities 102. Such a simulation by considering the "closeness" of radial velocities of simulation to that of the measurements is referred to as data assimilation. In some embodiments, the data assimilation is achieved using Computational fluid dynamics (CFD). Some embodiments are based on a recognition that both the horizontal and vertical velocities can be determined using the simulated velocity field. Further, the vertical velocities from the velocity field are used to estimate the corresponding horizontal derivatives. Subsequently, the horizontal derivatives are applied as correction for the horizontal projection of the measured radial velocities. As a result of this correction, the accuracy of the horizontal velocity estimation is improved.

However, in the CFD simulation, operating parameters, such as boundary or atmospheric conditions are unknown, and those operating parameters are determined iteratively until the operating parameters result into the measured radial velocities. As a result, performing the data assimilation with the CFD is very time consuming. Further, the data assimilation with the CFD is tedious as the CFD simulation is an optimization process based on solutions of Navier-Stokes equations. Moreover, the CFD simulation becomes complex for the wind flow over the complex terrains.

To that end, some embodiments are based on representation or approximation of the complex terrain with convex shapes, e.g., cylinders. In some embodiments, the complex terrain is approximated with an equivalent cylinder. In some other embodiments, the terrain is approximated with multiple convex shapes. Such a representation simplifies the simulation of the velocity field. Further, the wind flow around such cylinder is approximated with potential flow. The potential flow involves algebraic solution of Laplacian equations, rather than iterative optimization of the Navier-Stokes equations, thereby, increasing efficiency of the computation. Additionally, the Laplace equations are easier to solve compared to the Navier-Stokes equations.

However, such an approximation degrades the velocity field simulation. Some embodiments are based on realization that while such approximation maybe not accurate enough for the determination of the velocity field, the approximation is accurate enough for determination of the horizontal derivatives of the vertical velocities as the correction that improves the horizontal projection of the measured radial velocities. Therefore, accuracy of horizontal velocities estimation is significantly improved with minimal degradation of the velocity field.

To that end, some embodiments are based on a realization that the data assimilation is achieved based on the approximation of the terrain with the convex shapes to fit the measurements of the radial velocities, to estimate the velocity field. Further, the horizontal velocities are estimated as a horizontal projection of the corresponding radial velocities corrected with corresponding horizontal derivatives of vertical velocities of the estimated velocity field. Additionally, or alternatively, embodiments based on such formulation can perform the wind reconstruction and/or compute the horizontal velocity online i.e. in real-time.

In an embodiment, for the potential flows (in the Laplacian equations), the velocity is expressed in terms of a velocity potential and, also, the potential flow solution yields a stream function. Some embodiments are based on recognition that, in a fluid flow (wind), either the velocity potential or the stream function satisfying the Laplacian equation can be utilized to define a flow field. Since the Laplace equation is linear, various solutions can be added to obtain required solutions. For example, for linear partial differential equation (such as the Laplacian equation), solutions to various boundary conditions is sum of individual boundary conditions. Some embodiments are based on a realization that in the flow field, a streamline can be considered as a solid boundary as there is no flow through it. Moreover, conditions along the solid boundary and the streamline are the same. Hence, combinations of the velocity potential and stream functions of basic potential flows leads to a particular body shape that can be interpreted as the fluid flow around that body. A method of solving such potential flow problems is referred to as superposition.

Some embodiments are based on a recognition that the potential flow around the cylinder can be determined by the combination of the velocity potential and the stream function of the basic potential flows. The basic potential flows include uniform flow, source/sink flow, doublet flow and the like. In an embodiment, a combined flow that corresponds to a model of the fluid flow around the cylinder is obtained by a combination of the uniform flow and the doublet flow.

Some embodiments are based on objective of determining a mapping between the cylinder and the complex shape (e.g., a complex terrain). In some embodiments, such mapping can be determined by using conformal mapping which includes analytical mapping of complex numbers. In the conformal mapping, a transformation function is used for transformation of a complex valued function from one coordinate system to another. In some other embodiments, the mapping between the cylinder and the complex shape is determined based on machine learning methods. Some embodiments are based on recognition that a set of convex shapes (cylinders)

can be superposed for mapping with the complex terrain or approximating the complex terrain.

To that end, some embodiments are based on objective of determining the radius of cylinders that approximate the complex terrain, and upstream velocity. Some embodiments are based on realization that unknown values i.e. the radius of cylinders and velocity can be estimated using a direct-adjoint looping (DAL) method. Such embodiments estimate the most probable distribution of cylinders and the upstream velocity by minimizing a cost function. The DAL method is initialized with an initial estimate of the radius of cylinders and the upstream velocity. According to some embodiments, the DAL is an optimization method that includes analytical solution of the potential flow for the distribution of cylinders and the adjoint (or sensitivity) equations in an iterative manner.

Accordingly, one embodiment discloses a wind flow sensing system for determining wind flow at a set of different altitudes above a terrain having a non-convex shape from a set of measurements of radial velocities at each of the altitudes, comprising: an input interface configured to receive the set of measurements of radial velocities at line-of-site points above the terrain for each of the altitudes; a processor configured to estimate velocity fields for each of the altitudes based on data assimilation of the velocity fields above an approximation of the shape of the terrain with a set of one or multiple convex shapes to fit the measurements of radial velocities, and estimate horizontal velocities at each of the altitudes as a horizontal projection of the corresponding radial velocities corrected with corresponding horizontal derivatives of vertical velocities of the estimated velocity fields; and an output interface configured to render the estimated horizontal velocities at each of the altitudes.

Accordingly, another embodiment discloses a wind flow sensing method for determining wind flow at a set of different altitudes above a terrain having a non-convex shape from a set of measurements of radial velocities at each of the altitudes, wherein the method uses a processor coupled with stored instructions implementing the method, wherein the instructions, when executed by the processor carry out steps of the method, comprising: receiving the set of measurements of radial velocities at line-of-site points above the terrain for each of the altitudes; estimating velocity fields for each of the altitudes based on data assimilation of the velocity fields above an approximation of the shape of the terrain with a set of one or multiple convex shapes to fit the measurements of radial velocities; estimating horizontal velocities at each of the altitudes as a horizontal projection of the corresponding radial velocities corrected with corresponding horizontal derivatives of vertical velocities of the estimated velocity fields; and outputting the estimated horizontal velocities at each of the altitudes.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 7 shows a block diagram of a method for selecting operating parameters, according to some embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1:
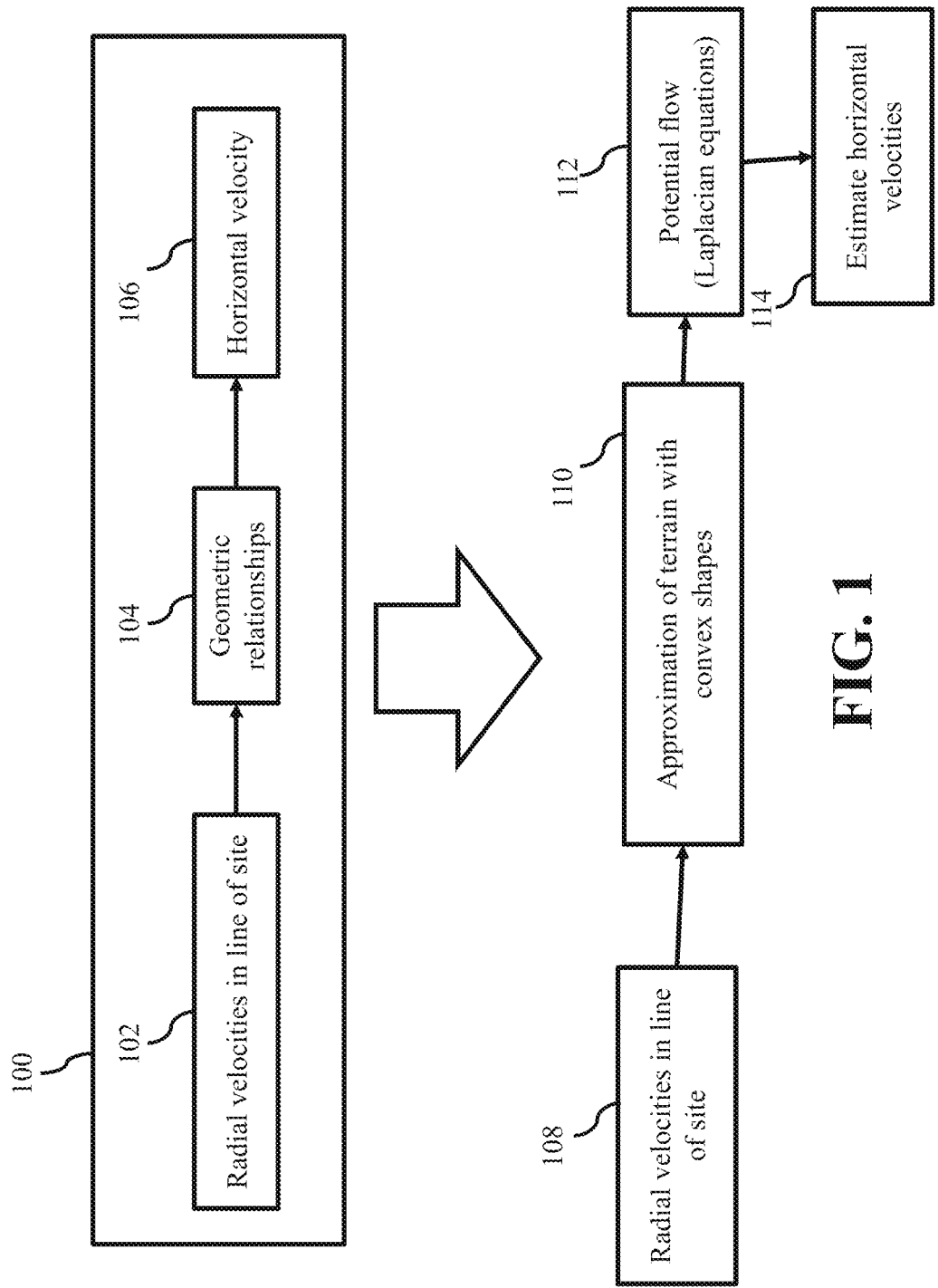
FIG. 1 shows a schematic overview of principles used by some embodiments for fast wind flow measurement in a complex terrain.

FIG. 1 shows a schematic overview of principles used by some embodiments for fast wind flow measurement in a complex terrain. Remote sensing instruments, such as LiDAR is used for measuring a subset of characteristics of wind in atmosphere. Different characteristics of the wind include wind velocity (horizontal and vertical velocity), turbulence, direction of the wind and the like. In a method 100, the LiDAR measures radial velocities 102 of the wind in line of sight (LOS) direction. However, horizontal velocity vector is a parameter of interest.

To that end, some embodiments are based on reconstruction of the wind from the measured radial velocities 102 using geometrical relationships 104. In other words, the horizontal velocities 106 are obtained by horizontal projection of the measured radial velocities 102. In practice, such a projection is inaccurate as the measured radial velocities are different for different altitudes, and even for the same altitude LiDAR measures five different radial velocities having different values. Also, corresponding horizontal projections of the radial velocities do not consider variations of velocities in vertical direction. Furthermore, such projection doesn't hold true for the wind flow over complex terrains such as hills, or near large building or other urban structures.

To that end, some embodiments are based on an objective of considering variation of velocities in the vertical direction (namely, vertical variation). Some embodiments are based on a realization that horizontal derivatives of vertical velocities can be used as correction on the horizontal projections of the measured radial velocities, to consider the vertical variation. In such embodiments, at first, the vertical velocities are determined by data assimilation that simulate velocity field of the wind flow to find the velocity field that fits the measurements of radial velocities 102. Such a simulation by considering the "closeness" of radial velocities of simulation to that of the measurements, is referred to as data assimilation. In some embodiments, the data assimilation is achieved using Computational fluid dynamics (CFD). Some embodiments are based on a recognition that both the horizontal and vertical velocities can be determined using the simulated velocity field. Further, the vertical velocities from the velocity field are used to estimate the corresponding horizontal derivatives and, subsequently, the horizontal derivatives are applied as correction for the horizontal projection of the measured radial velocities. As a result of this correction, the accuracy of the horizontal velocity estimation is improved.

However, in the data assimilation, operating parameters, such as boundary or atmospheric conditions are unknown, and those operating parameters are determined iteratively until the operating parameters result into the measured radial velocities. As a result of this, performing the data assimilation with the CFD is very time consuming. Further, the data assimilation with the CFD is tedious as the CFD simulation is an optimization process based on solutions of Navier-Stokes equations. Moreover, the CFD simulation becomes complex for the wind flow over the complex terrains.

To that end, some embodiments are based on representation or approximation of the complex terrain with convex shapes 110, e.g., cylinders. In some embodiments, the complex terrain is approximated with an equivalent cylinder. In some other embodiments, the terrain is approximated with multiple convex shapes. Such a representation simplifies the simulation of the velocity field. Further, the wind flow around such cylinder is approximated with potential flow 112. The potential flow 112 involves algebraic solution of Laplacian equations, rather than iterative optimization of the Navier-Stokes equations, thereby, increasing efficiency of the computation. Additionally, the Laplace equations 112 are easier to solve compared to the Navier-Stokes equations, and in case of simple shapes e.g. cylinders, there exists analytical solution in a closed mathematical form. However, such an approximation 110 degrades the velocity field simulation. Some embodiments are based on realization that while such approximation 110 maybe not accurate enough for the determination of the velocity field, the approximation 110 can be accurate enough for determination of the horizontal derivatives of the vertical velocities as the correction that improves that horizontal projection of the measured radial velocities 108. Therefore, accuracy of horizontal velocities estimation 114 is significantly improved with minimal degradation of the velocity field.

To that end, some embodiments are based on a realization that the data assimilation is achieved based on the approximation of the terrain with the convex shapes 110 to fit the measurements of radial velocities 108, to estimate the velocity field. Further, the horizontal velocities are estimated 114 as a horizontal projection of the corresponding radial velocities corrected with corresponding horizontal derivatives of vertical velocities of the estimated velocity field. Additionally, or alternatively, embodiments based on such formulation can perform the wind reconstruction and/or compute the horizontal velocity online i.e. in real-time.

Figure 2:
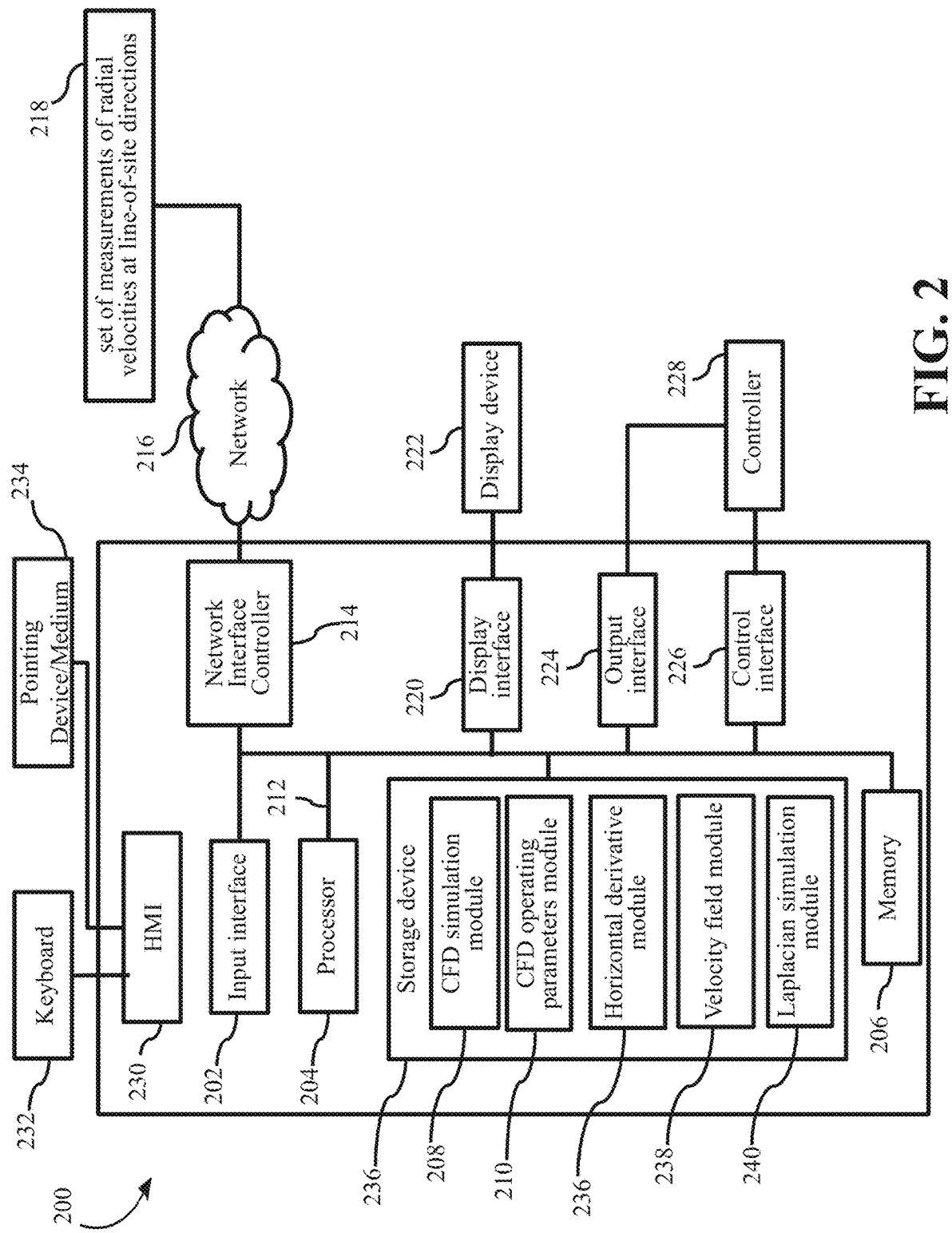
FIG. 2 shows a block diagram of a wind flow sensing system for determining the wind flow, according to some embodiments.

FIG. 2 shows a block diagram of a wind flow sensing system 200 for determining the wind flow, in according to some embodiments. The wind flow sensing system 100 includes an input interface 202 to receive a set of measurements 218 of the radial velocities at the line-of-site directions for each of the altitudes. In some embodiments, the measurements 218 are measured by the remote sensing instrument, such as a ground-based LiDAR, on a cone. The wind flow sensing system 200 can have a number of interfaces connecting the system 200 with other systems and devices. For example, a network interface controller (NIC) 214 is adapted to connect the wind flow sensing system 200, through a bus 212, to a network 216 connecting the wind flow sensing system 200 with the remote sensing instrument configured to measure the radial velocities of the wind flow. Through the network 216, either wirelessly or through wires, the wind flow sensing system 200 receives the set of measurements 218 of the radial velocities at the line-of-site directions for each of the altitudes.

Further, in some embodiments, through the network 216, the measurements 218 can be downloaded and stored within a storage system 236 for further processing. Additionally, or alternatively, in some implementations, the wind flow sensing system 200 includes a human machine interface 230 that connects a processor 204 to a keyboard 232 and pointing device 234, wherein the pointing device 234 can include a mouse, trackball, touchpad, joy stick, pointing stick, stylus, or touchscreen, among others.

The wind flow sensing system 200 includes the processor 204 configured to execute stored instructions, as well as a memory 206 that stores instructions that are executable by the processor. The processor 204 can be a single core processor, a multi-core processor, a computing cluster, or any number of other configurations. The memory 206 can include random access memory (RAM), read only memory (ROM), flash memory, or any other suitable memory systems. The processor 204 is connected through the bus 212 to one or more input and output interfaces and/or devices.

According to some embodiments, the instructions stored in the memory 206 implement a method for determining the velocity fields of the wind flow at a set of different altitudes from the set of measurements of the radial velocities at each of the altitudes. To that end, the storage device 236 can be adapted to store different modules storing executable instructions for the processor 204. The storage device 236 stores a CFD simulation module 208 configured to estimate the velocity field at each of the altitudes by simulating computational fluid dynamics (CFD) of the wind flow with current values of the operating parameters. The storage device 236 also stores a CFD operating parameters module 210 configured to determine the values of the operating parameters reducing a cost function, and horizontal derivative module 236 configured to determine the horizontal derivatives of vertical velocities from the velocity field. Further, the storage device 236 stores a velocity field module 238 configured to determine the velocity field including the horizontal velocity using the horizontal derivative of vertical velocity and the measurements of the radial velocity. Furthermore, the storage device 236 stores a Laplacian simulation module 240 configured to approximate the shape of the terrain with a set of one or multiple convex shapes to fit the measurements of radial velocities. The Laplacian simulation module 240 is configured to solve multiple Laplacian equations which define dynamics of the wind flow for specific values of inlet velocity field and the radius of the convex shape, to approximate the shape of the terrain. The storage device 236 can be implemented using a hard drive, an optical drive, a thumb drive, an array of drives, or any combinations thereof.

The wind flow sensing system 200 includes an output interface 224 to render the estimated horizontal velocities at each of the altitudes. Additionally, the wind flow sensing system 200 can be linked through the bus 212 to a display interface 220 adapted to connect the wind flow sensing system 200 to a display device 222, wherein the display device 222 may be a computer monitor, camera, television, projector, or mobile device, among others. Additionally, the wind flow sensing system 200 includes a control interface 226 configured to submit the estimated horizontal velocities at each of the altitudes to a controller 228 which is integrated with a machine, such as wind turbine. The controller 228 is configured to operate the machine based on the estimated horizontal velocities at each of the altitudes. In some embodiments, the output interface 224 is configured to submit the estimated horizontal velocities at each of the altitudes to the controller 228.

Figure 3A:
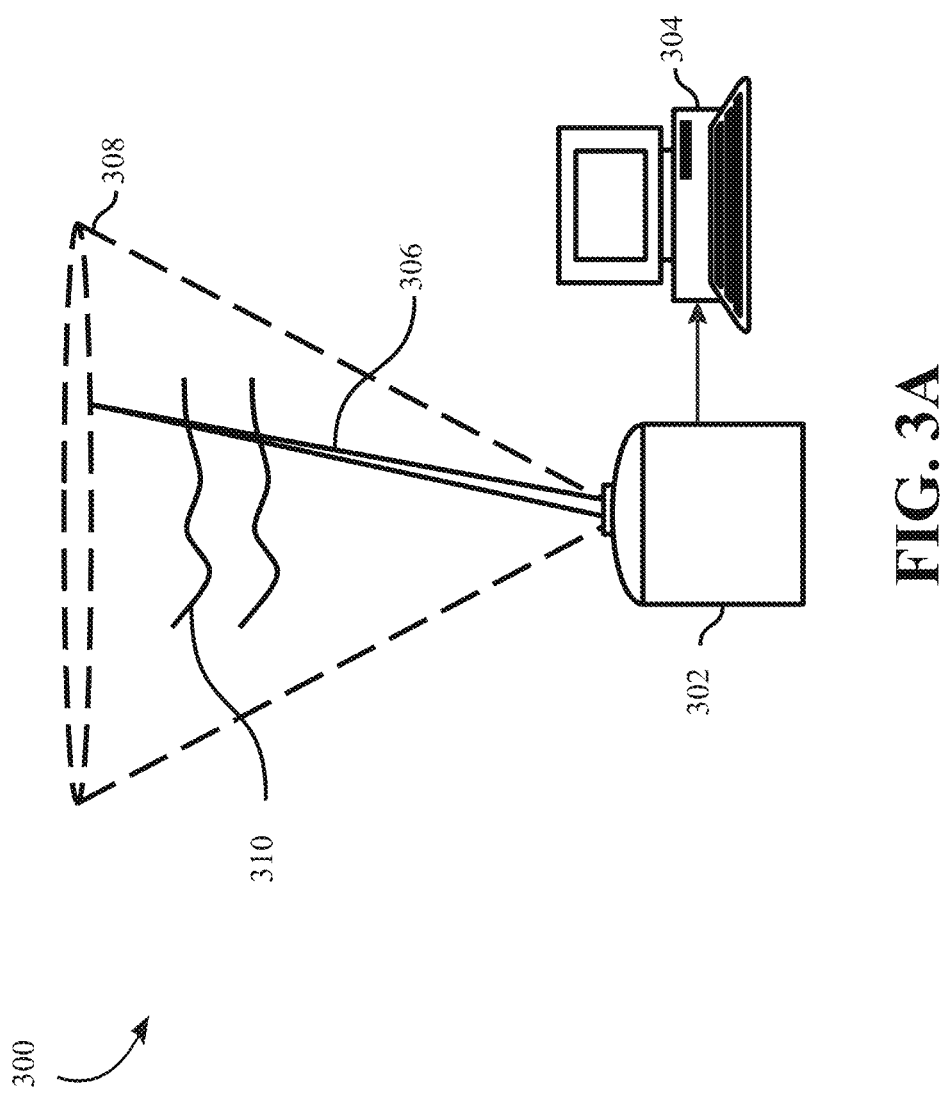
FIG. 3A shows a schematic of an exemplar remote sensing instrument configured to measure radial velocities of the wind flow, according to some embodiments.

FIG. 3A shows a schematic of an exemplar remote sensing instrument configured to measure the radial velocities of the wind flow, according to some embodiments. A LiDAR 300 is configured to measure the radial velocity 218 of the wind flow at different altitudes. Different embodiments use different remote sensing instruments. Examples of these instruments include radar, LiDAR, and SODAR. For clarity purpose, this disclosure uses the LiDAR 300 as an exemplar remote sensing instrument.

The radial velocity of an object with respect to a given point is the rate of change of a distance between the object and the point. That is, the radial velocity is the component of the object's velocity that points in the direction of the radius connecting the object and the point. In case of atmospheric measurements, the point is the location of the remote sensing instrument, such as radar, LiDAR and SODAR, on Earth, and the radial velocity denotes the speed with which the object moves away from or approaches a receiving instrument (LiDAR device 300). This measured radial velocity is also referred to as line-of-sight (LOS) velocity.

The remote sensing instrument determines the flow of a fluid, such as air, in a volume of interest by describing the velocity field of the airflow. For example, the LiDAR 300 includes a laser 302 or acoustic transmitter and a receiver in which a return signal 306 is spectra analyzed, a computer 304 for performing further calculations, and navigator for aiming the transmitter and/or receiver at a target in space at a considerable distance from said transmitter and receiver. The receiver detects the return signal 306 scattered due to presence of pollutants between the remote sensing system and said target along axis of measurement. Laser is transmitted along a cone surface 308 formed by possible aiming directions. The radial velocity of the particles at volume of interest 310 at said target is deduced from frequency shift by Doppler Effect due to specific air pollutants.

Figure 3B:
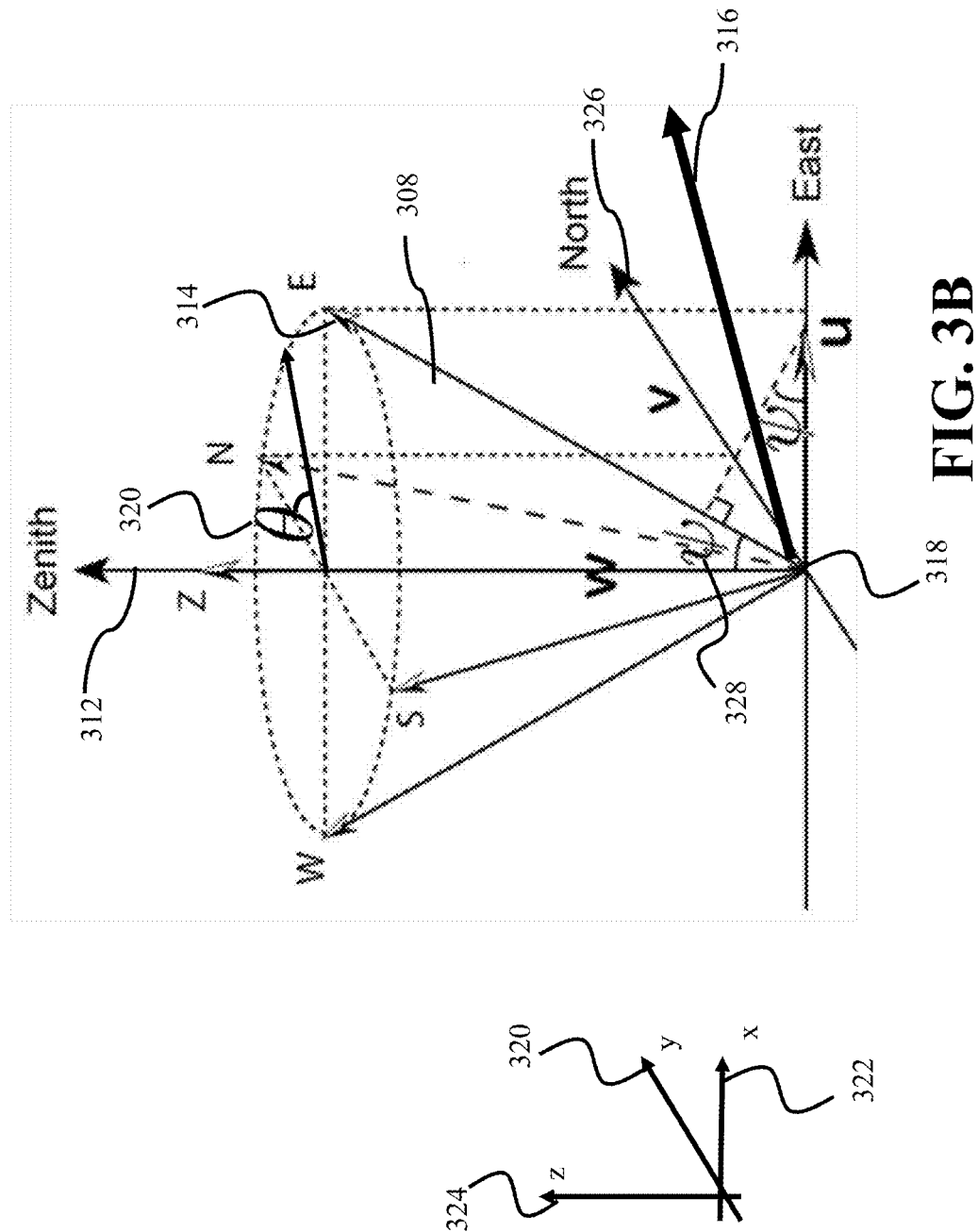
FIG. 3B shows a schematic of geometry of the radial velocities measured by some embodiments at a specific altitude along a surface of a cone and along a center line of cone.

FIG. 3B shows a schematic of geometry of the radial velocities measured by some embodiments at a specific altitude along the surface of the cone 308 and along the center line of cone 312. The LiDAR measurements provide the radial (line-of-sight) velocity component of the wind, making it difficult to precisely determine wind magnitude and direction, due to so-called 'cyclops' dilemma. This phenomenon refers to a fact that exact reconstruction of an arbitrary 3D velocity field cannot be performed using a single LOS measurement. Radial velocity 314 along one beam shows a projection of a velocity vector 316 with the LiDAR located at a position 318 in a Cartesian coordinate system 320, 322, and 324.

Here, θ 320 is horizontal wind direction measured clockwise from North 326, ψ 328 is elevation angle of beam, (u, v, w) are x 322, y 320, and z 324 components of velocity V of wind at each point in space.

Horizontal velocity $v_h$ at each altitude is defined as $$v_h = \sqrt{u^2+v^2} \qquad \text{Equation 1}$$

The radial velocity (also called LOS velocity) is defined on each altitude as $$v_R = u \sin\theta \sin\psi + v \cos\theta \sin\psi + w \cos\psi \qquad \text{Equation 2}$$

Figure 3C:
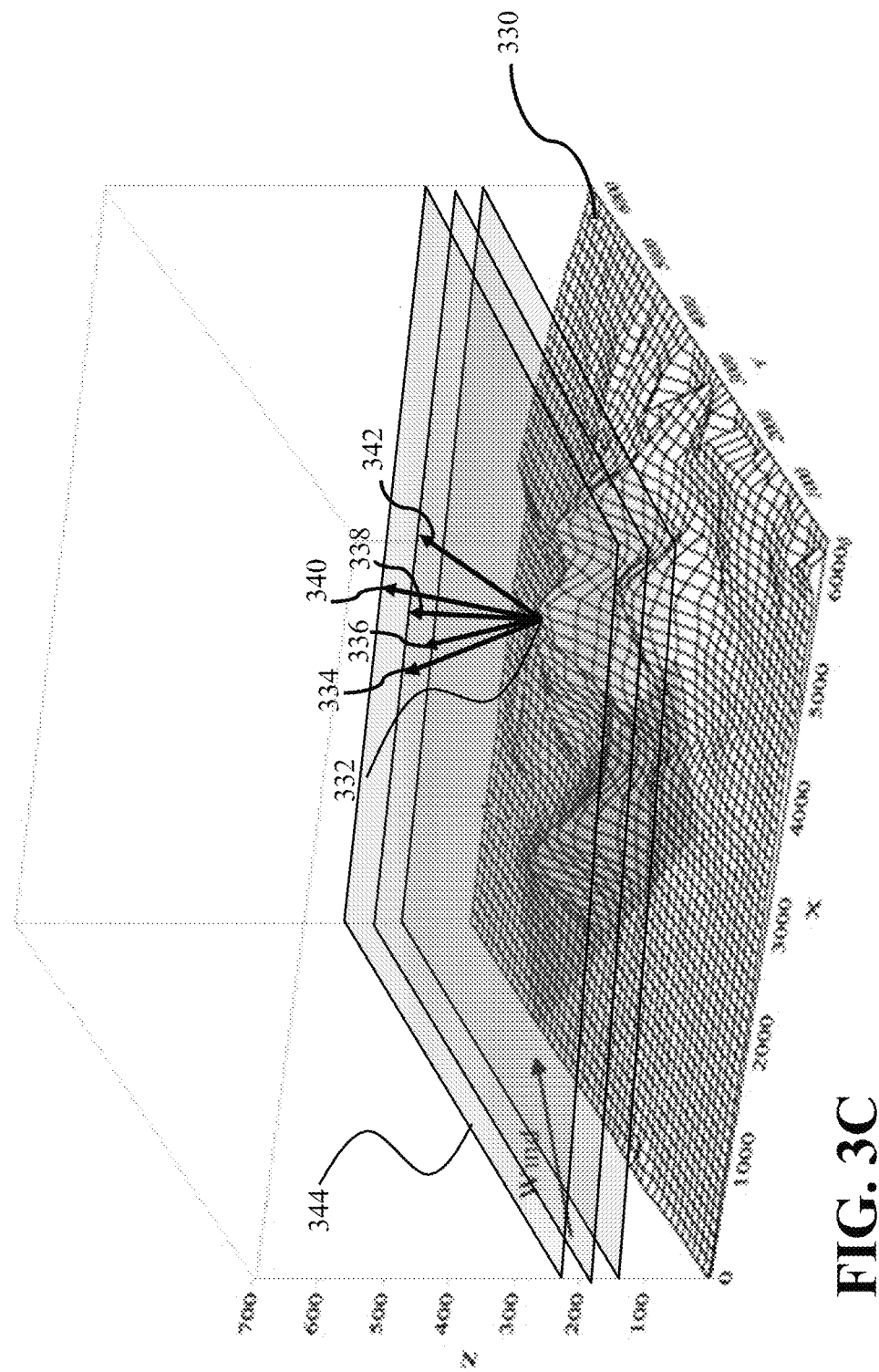
FIG. 3C shows a schematic of a remote sensing of the wind over the complex terrain used by some embodiments.

FIG. 3C shows a schematic of a remote sensing of the wind over a complex terrain 330 used by some embodiments. The LiDAR 300 arranged at a point 332, e.g., at a top of a hill, performs series of line-of-sight measurements on a cone including measurements 334, 336, 340, 342 along the surface of the cone, and measurements along the center line 338. The measurements are taken for different altitudes illustrated as different planes 344. In such a manner, for each of the altitudes 344, the measurements on the cone are measurements on a circle including multiple measurements of the radial velocities in different angular directions measured at different line-of-site points on a circumference of the circle and one measurement of the radial velocity in a vertical direction measured at a center of the circle. The line-of-sight measurements correspond to line-of-sight velocities.

One embodiment aims to determine the horizontal velocity $v_h$ of the wind flow for each of the altitudes. Given these measurements, an estimate of the horizontal velocity $v_h$ can be determined from the measurements of radial velocity $v_R$ using a geometrical relationship and assuming that the wind velocity is homogenous on each plane. Here, $V_L = (u_L, v_L, w_L)$ is the estimated velocity of the wind flow based on homogenous assumption.

For example, the following formulas yield estimated velocity in terms of radial velocities V1, V2, V3, V4, V5 corresponding to the beams pointing North, East, South, West and the center line:

$$u_L = \frac{V1-V3}{2\sin\psi}, v_L = \frac{V2-V4}{2\sin\psi}, w_L = V5$$

Some embodiments are based on recognition that, for the complex terrains, such as the terrain 330, homogenous velocity assumption leads to a bias in LiDAR estimation of the horizontal velocity. The main error is due to variation of the vertical velocity w in the vertical direction, e.g., along the hill. To that end, some embodiments are based on realization that the homogeneous velocity assumption in sensing the wind flow passing over the complex terrain can be corrected using the horizontal derivative of the vertical velocity.

Figure 4:
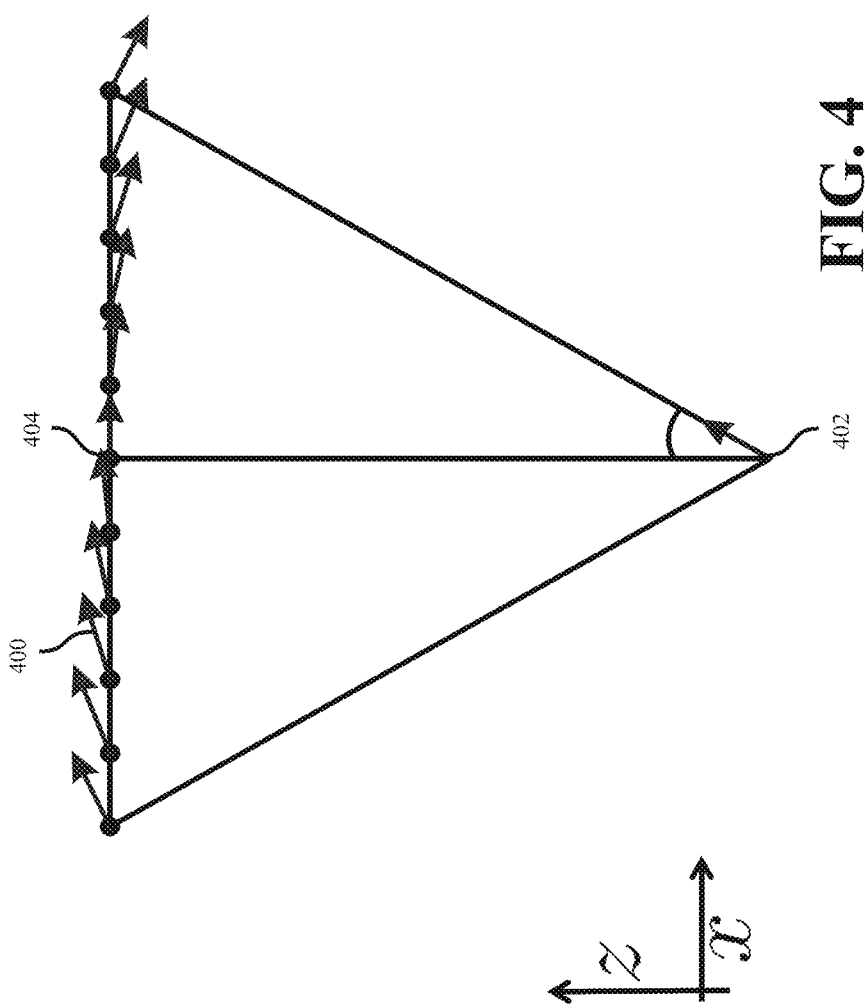
FIG. 4 shows a schematic of exemplar parameters of the wind flow used by some embodiments to estimate velocity fields of the wind flow.

FIG. 4 shows a schematic of exemplar parameters of the wind flow used by some embodiments to estimate the velocity fields of the wind flow. Some embodiments are based on recognition that the homogeneous velocity assumption in sensing the wind flow passing over the complex terrain is incorrect, but can be corrected using the horizontal derivative of the vertical velocity. FIG. 4 shows a two-dimensional illustration of the wind flow when the LiDAR 300 is placed near the top of a hill, e.g., at the location 332. The horizontal derivative of the vertical velocity can show a change in direction and/or magnitude of vertical velocity 400 at a given altitude. In this example, the horizontal derivative of the vertical velocity indicates an increase of the vertical velocity along one slop of the hill until the top of the hill at the point 402, and decrease of the vertical velocity from the point 404 over another slop of the hill. Also, first derivative showing a linear change of the vertical velocity can be used to improve accuracy of the wind flow sensing, because the homogeneous velocity assumption causes leading order terms in error of the sensed velocity fields.

The error or bias can be written to first order for any point at altitude z above device 300 as:

$$u_L = u + z\frac{dw}{dx} \qquad \text{Equation 3a}$$

$$v_L = v + z\frac{dw}{y} \qquad \text{Equation 3b}$$

Hence, the bias due to homogenous assumption is proportional to i) altitude z above the device 300, ii) horizontal gradients of vertical velocity dw/dx and dw/dy. Such error is not a function of the elevation angle ψ and reducing such angle will not reduce the bias in the horizontal velocity. Some embodiments are based on realization that an estimate of dw/dx and dw/dy may not be obtained solely based on the radial velocity measurements. The resulting equation is underdetermined due to symmetry of scanning beams.

Incompressibility of a flow refers to a flow in which material density is constant within a fluid parcel, an infinitesimal volume that moves with a flow velocity. Such physical principle is based on conservation of mass. Some embodiments are based on realization that the leading order errors caused by the homogenous velocity assumption are incompressible. In other words, it can be shown that the bias term consisting of product of altitude and the horizontal gradient of the vertical velocity conserves mass. This implies that for the wind flow over the complex terrain, enforcing incompressibility condition on the volume of fluid inside the domain of interest does not correct the leading order error caused by the homogenous flow assumption.

Computational fluid dynamics (CFD) is a branch of fluid mechanics that uses numerical analysis and data structures to solve and analyze problems that involve fluid flows. Computers are used to perform calculations required to simulate interaction of liquids and gases with surfaces defined by boundary conditions. Some embodiments are based on general understanding that CFD can be used to estimate the velocity fields of the wind from the measurements of the wind on the cone sensed by the LiDAR. However, the operating parameters, such as the boundary conditions, for the wind flow over the complex terrains are usually unknown, and the approximation of those operating parameters can undesirably reduce the accuracy of the wind flow sensing.

Some embodiments are based on realization that while a CFD approximation maybe not accurate enough for the determination of the velocity field, the CFD approximation can be accurate enough for an average of the horizontal derivative of vertical velocity reconstruction at a given altitude, which in turn can be used for correcting the bias due to the homogenous velocity assumption. To that end, some embodiments use the CFD approximation to determine the horizontal derivative of vertical velocity and use the horizontal derivative of vertical velocity in combination with the radial velocity measurements of the wind flow on the desired altitudes to determine the velocity field for the desired altitudes. In such a manner, a target accuracy of the velocity field sensing using the radial velocity measurements can be achieved.

Figure 5A:
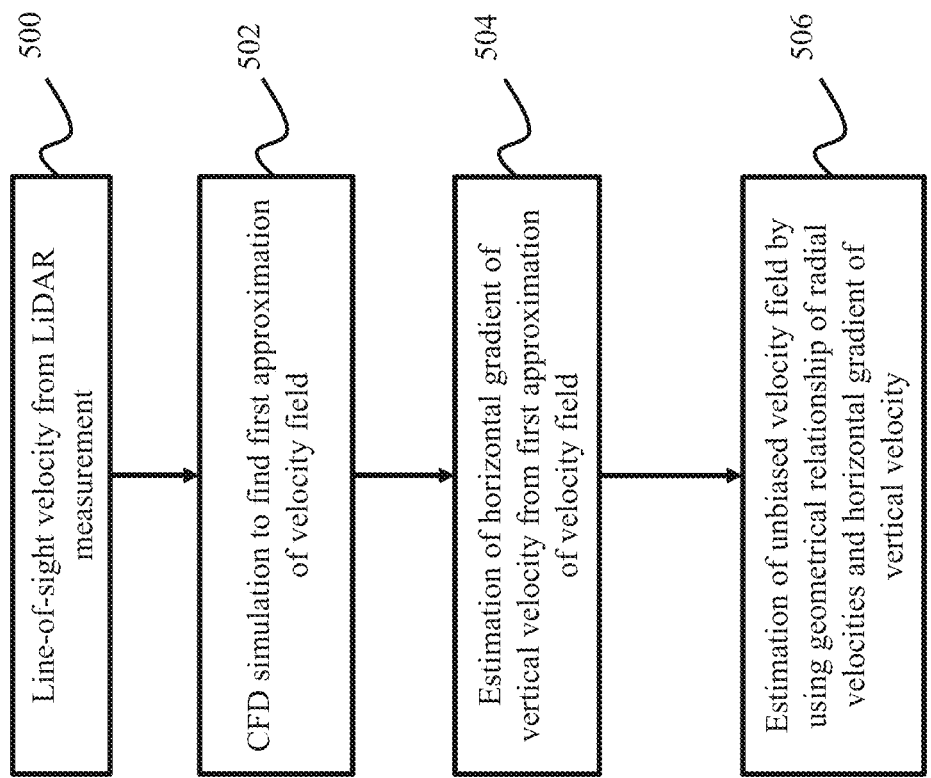
FIG. 5A shows a block diagram of a Computational Fluid dynamics (CFD) framework to resolve the wind flow, according to some embodiments.

FIG. 5A shows a block diagram of a Computational Fluid dynamics (CFD) framework used by some embodiments to resolve the wind flow with an aim of obtaining an accurate measure of the horizontal gradients of vertical velocity at each altitude of interest. Using the line-of-sight measurements 500, a first approximation of the velocity field is obtained 502 by the CFD simulation. For example, the CFD simulation can be performed by the CFD simulation module 208 shown in FIG. 2. In a number of situations, the CFD simulation requires the operating parameters, such as boundary and atmospheric conditions. Those operating parameters are typically unknown. To that end, some embodiments determine the operating parameters reducing the difference between estimated and measured radial velocities. For example, such estimation can be performed by the CFD operating parameters module 210 shown in FIG. 1.

While the velocity field in the first approximation provided by the CFD is inaccurate for the required purposes, an estimate of the horizontal gradient of the vertical velocity 504 can be extracted with required accuracy. Such an extraction can be performed by the module 236. The CFD simulation yields velocity field at discrete points of a mesh. Using this velocity field, the x and y derivative as each discrete point is computed using finite difference method. Then, a single value for x and y horizontal derivatives $$\left(\frac{dw}{dx}, \frac{dw}{dy}\right)$$

of the vertical velocity at each plane is extracted by averaging the derivatives in x and y directions over the respective plane. This horizontal gradient of vertical velocity is then used along with the geometrical relationship between line-of-sight velocity and wind velocity to correct 506 the biased horizontal velocity components $u_L$ and $v_L$ based on the homogenous assumption using Eqs. (3a) and (3b). Such estimation can be performed by the module 238.

Figure 5B:
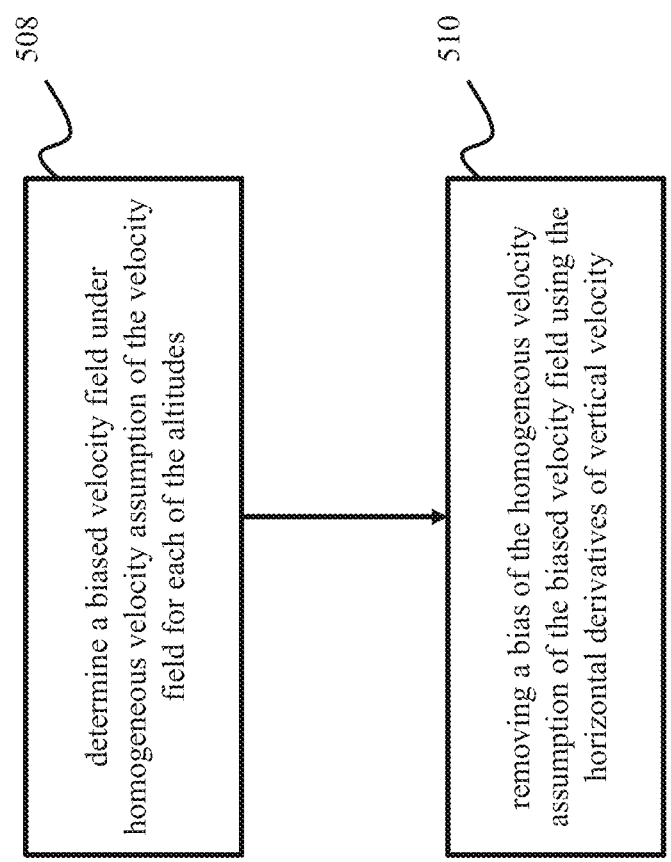
FIG. 5B shows a block diagram of a method for determining an unbiased velocity field, according to one embodiment.

FIG. 5B shows a block diagram of a method for determining an unbiased velocity field, according to one embodiment. The embodiment, in order to determine a second approximation of the velocity fields, determines the biased velocity field under homogeneous velocity assumption of the velocity field for each of the altitudes 508 and removes a bias of the homogeneous velocity assumption of the biased velocity field for each of the altitudes using the horizontal derivatives of vertical velocity 510

$$\left(\frac{dw}{dx}, \frac{dw}{dy}\right)$$

for the corresponding altitude.

For example, Equations 3a and/or 3b are used to obtain unbiased velocity fields (u, v) from biased velocity field $u_L$, $v_L$ by subtracting the bias terms $$z\frac{dw}{dx} \text{ and } z\frac{dw}{dy}.$$

Figure 6A:
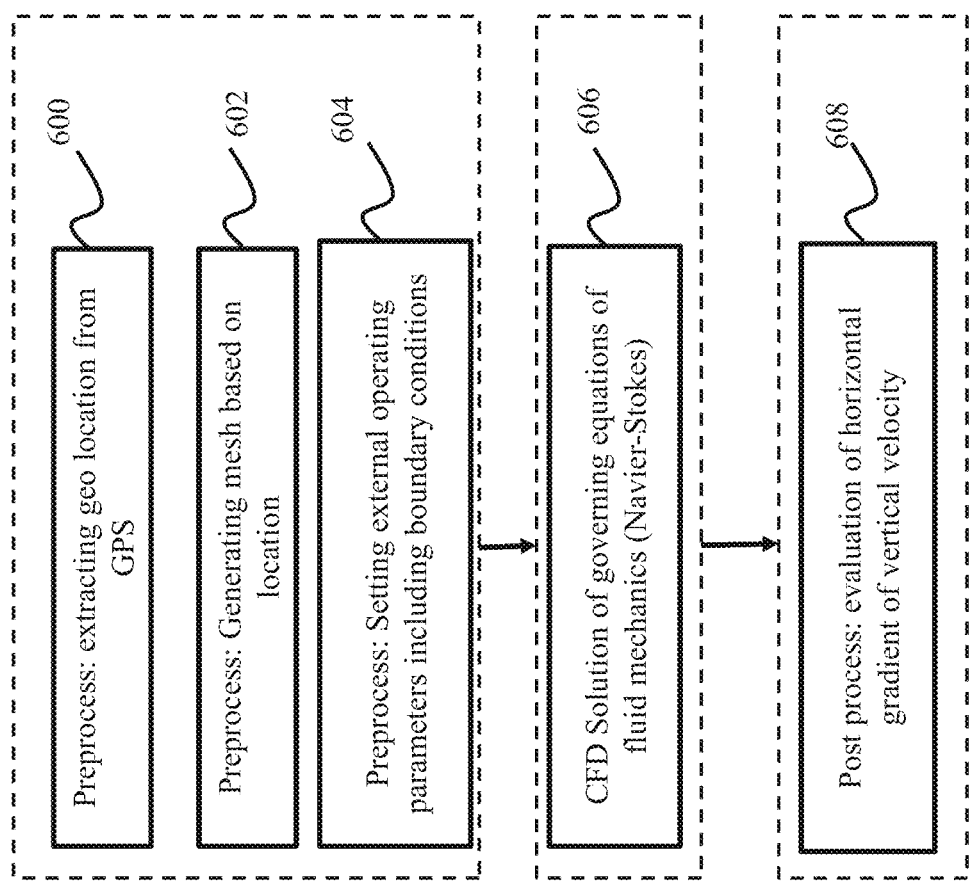
FIG. 6A shows a block diagram of a CFD simulation based framework for obtaining horizontal gradient of the vertical velocity, according to one embodiment.

FIG. 6A shows a block diagram of a CFD simulation based framework used by some embodiments to obtain the horizontal gradient of the vertical velocity 608. The embodiments perform a pre-processing step to define geometry and physical bounds of the CFD simulation. For example, some implementations use computer aided design (CAD) to define scope of the simulation. The volume occupied by a fluid (wind) is divided into discrete cells (the mesh). A GPS is used to extract geo-location 600 of the terrain. Such location is compared against available data-set stored in the device memory to generate terrain data. The terrain data can be gathered using various resources such as Google or NASA data bases. Further, an optimal radius is chosen to construct a mesh 610.

Figure 6B:
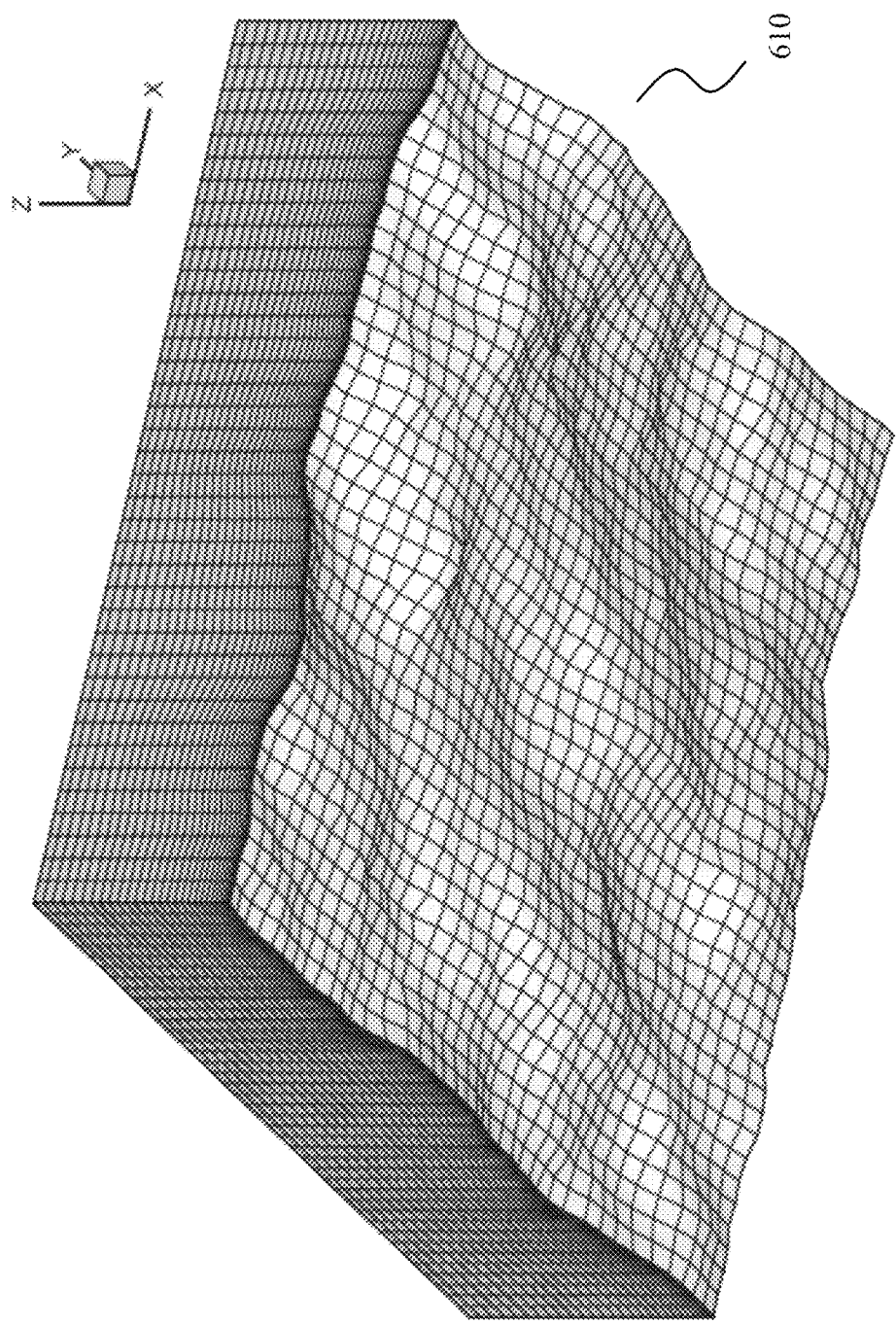
FIG. 6B shows an example of a mesh determined by some embodiments.

FIG. 6B shows an example of the mesh 610 determined by some embodiments. In various implementations, the mesh 610 can be uniform or non-uniform, structured or unstructured, consisting of a combination of hexahedral, tetrahedral, prismatic, pyramidal or polyhedral elements. An optimal mesh size and number is selected such that important terrain structure is captured in the mesh based on the wind direction. Based on the selected radius at the terrain, the mesh is generated. Additionally, resolution of the mesh is set manually.

During preprocessing, values of operating parameters 604 are also specified. In some embodiments, the operating parameters specify fluid behavior and properties at all bounding surfaces of fluid domain. A boundary condition (inlet velocity) of the field (velocity, pressure) specifies a value of a function itself, or a value of normal derivative of the function, or the form of a curve or surface that gives a value to the normal derivative and the variable itself, or a relationship between the value of the function and the derivatives of the function at a given area. The boundary conditions at solid surfaces defined by the terrain involve speed of the fluid that can be set to zero. The inlet velocity is decided based on the direction of the wind and the velocity having log profiles with respect to height, over flat terrains.

Some embodiments perform the CFD the simulation by solving 606 one of variations of the Navier-Stokes equations defining the wind flow with current values of the operating parameters. For example, the CFD solves the Navier-Stokes equation along with mass and energy conservation. The set of equations are proved to represent mechanical behavior of any Newtonian fluid, such as air, and are implemented for simulations of atmospheric flows. Discretization of the Navier-Stokes equations is a reformulation of the equations in such a way that they can be applied to computational fluid dynamics. A numerical method can be finite volume, finite element or finite difference, as we all spectral or spectral element methods.

The governing equations, Navier-Stokes, are as follows:

$$V \cdot \nabla V + \frac{1}{\rho}\nabla p - \nu \nabla^2 V = 0 \qquad \text{Equation 4a}$$

$$\nabla \cdot V = 0 \qquad \text{Equation 4b}$$

$\nabla \cdot$ is divergence operator. $\nabla$ is gradient operator, and $\nabla^2$ is Laplacian operator. Equations 4 can also be extended to the transient scenarios, where the variation of the velocity and pressure with time is taken into account.

Some embodiments denote the equations 4a and 4b as N(p, V)=0, the inlet velocity and direction are indicated by $V_{in}$, $\Theta_{in}$; p: pressure of air [pa] or [atm], ρ: density of air [kg/m$^3$], v: kinematic viscosity [m$^2$/s]. Succeeding the CFD simulation, the embodiments extract the horizontal gradients of the vertical velocity 608.

FIG. 7 shows a block diagram of a method for selecting the operating parameters, according to some embodiments. For example, some embodiments select 706 the operating parameters 700 based on a sensitivity 702 of the horizontal derivative of the vertical velocity (HDVV) to variations in the values of the operating parameters. In one embodiment, the operating parameters with the sensitivity above a threshold 704 are selected in a purpose-based set of operating parameters approximated during the CFD simulation. In such a manner, some embodiments adapt the unknown operating parameters of the CFD to the purpose of the CFD approximation. Such an adaptation of the operating parameters reduces computational burden without reducing the accuracy of the CFD approximation of quantities of interest. For example, some embodiments select the operating parameters such as terrain roughness, inlet mean velocity, inlet turbulence intensities, and atmospheric stability conditions.

In some embodiments, the operating parameters include inlet boundary conditions (velocity, direction), surface roughness, and atmospheric stability. In one embodiment, the operating parameters are chosen to be the inlet boundary conditions (velocity, direction), surface roughness, inlet turbulent kinetic energy and dissipation. The values of such operating parameters are not directly available from the LiDAR measurements.

$$V_{in} = \frac{V^*}{\kappa}\ln\left(\frac{z+z_0}{z_0}\right)$$ Equation 5a $$k_{in} = \frac{V^{*2}}{\sqrt{C_\mu}}$$ Equation 5b $$\epsilon_{in} = \frac{V^{*3}}{\kappa(z+Z_0)}$$ Equation 5c $$V^* = \frac{V_{ref}\kappa}{\ln\left(\frac{z_{ref}+z_0}{z_0}\right)}$$ Equation 5d $C_\mu$ a constant in k–∈ turbulence model,
κ von Karman's constant,
V* friction velocity [m/s],
$V_{ref}$ a reference velocity chosen at a reference location and the reference location can be arbitrary [m/s],
$z_{ref}$ is the reference altitude [m],
$z_0$ surface roughness.

Turbulence kinetic energy is the kinetic energy per unit mass of turbulent fluctuations. Turbulence dissipation, ∈ is the rate at which the turbulence kinetic energy is converted into thermal internal energy.

Some embodiments are based on recognition that in a number of situations the operating parameters for simulating the CFD are unknown. For example, for the case described above, in equations 5a-5d at inlet $V_{ref}$, $z_{ref}$, $z_0$ are the unknown operating parameters, and the remote sensing measurements does not directly provide such values.

Figure 8:
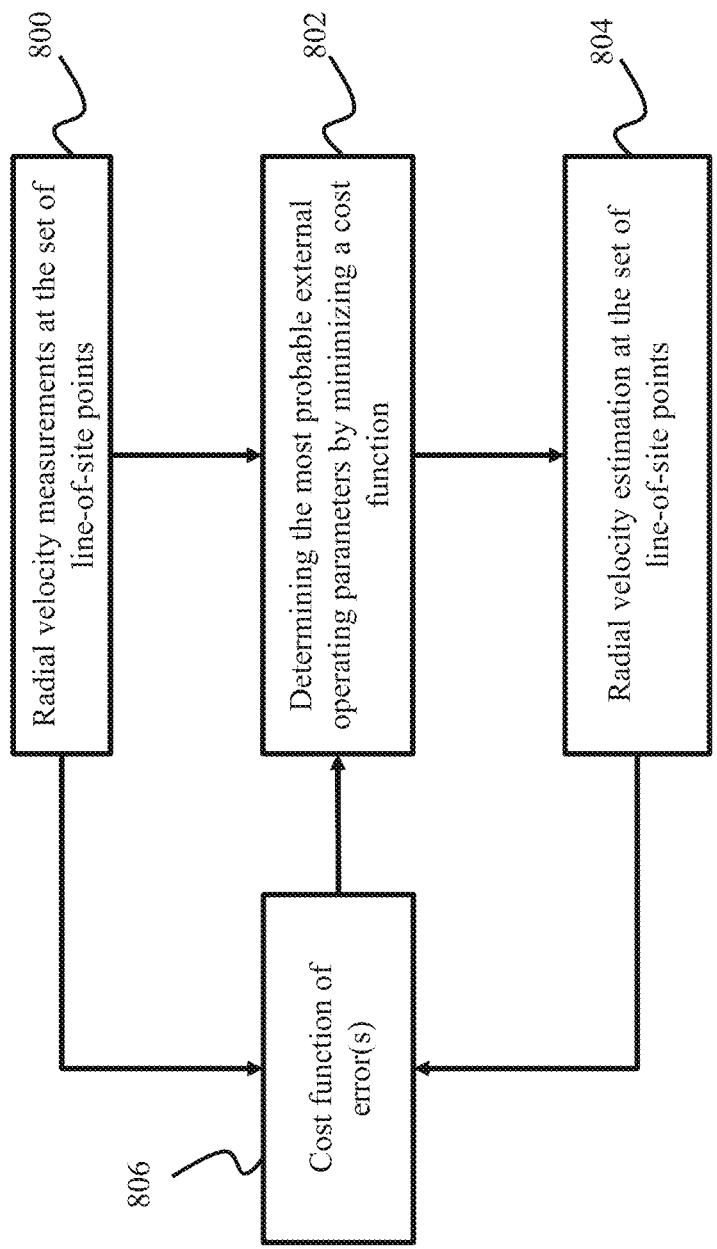
FIG. 8 shows a flowchart of a method for determining current values of the operating parameters, according to some embodiments.

FIG. 8 shows a flowchart of a method for determining current values of the operating parameters, according to some embodiments. Specifically, some embodiments determine 802 the operating parameters that minimize an error between measurements of the radial velocity 800 at a set of line-of-site points and estimation 804 of the radial velocity at the same set of line-of-site points performed by the CFD with the current values of the operating parameters.

Figure 9:
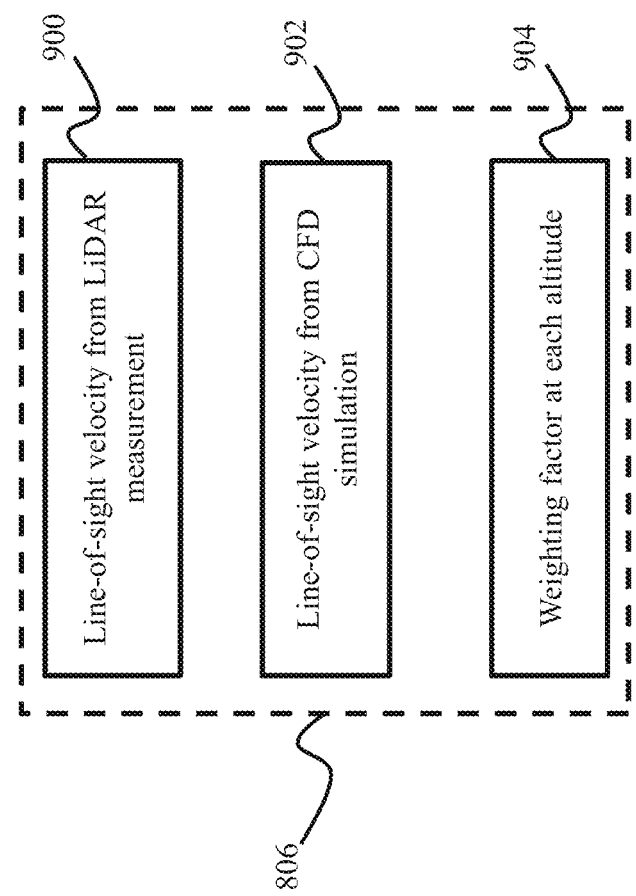
FIG. 9 shows a process of assigning different weights to different terms in a cost function, according to some embodiments.

Some embodiments are based on realization that when the CFD is used for extracting the horizontal derivative of the vertical velocity, a particular cost function 806 is minimized to obtain an estimate of the operating parameters. Specifically, some embodiments are based on realization that the horizontal derivative of the vertical velocity has different effects on the velocity field in dependence on the altitude. To that end, the cost function 806 includes a weighted combination of errors. Each error corresponds to one of the altitudes and includes a difference between the measured velocities at the line-of-site points at the corresponding altitude and simulated velocities at the line-of-site points simulated by the CFD for the corresponding altitude with current values of the operating parameters. In addition, the weights for at least some errors are different. For example, the errors include a first error corresponding to a first altitude and a second error corresponding to a second altitude, wherein a weight for the first error in the weighted combination of errors is different from a weight of the second error in the weighted combination of errors FIG. 9 shows a process of assigning different weights to different terms in the cost function, according to some embodiments. In some examples, the cost function 806 returns a number representing how well the CFD simulation (Line-of-sight velocity from the CFD simulation) 902 matches with LiDAR data (Line-of-sight velocity from the LiDAR measurements) 910 along the line of sight of different beams at various altitudes. To that end, to determine the horizontal derivative of the vertical velocity by the CFD, the cost function considers different altitudes differently, e.g., with different weights 930. For example, in some embodiments, the cost function includes a weighted combination of errors representing accuracy of the CFD for the different altitudes.

In one embodiment, the cost function is $$J=\Sigma_{i=1}^{i=N}w_i(v_{R,i}-v_{R,CFD})^2$$ Equation 6 i is each measurement point, $v_{R,i}$ is the light-of-sight velocity at location of point i and $v_{R,CFD}$ is the radial velocity computed from the CFD simulation at location of point i, $w_i$ is the weighting factor. The error in each term is proportional to the difference of radial velocity between measurement and CFD. To give more weight to the estimation of the vertical velocity gradients at higher altitudes, some implementations set the weighting factor $w_i$ proportional to the altitude, i.e. height above the device location. For example, $v_{R,CFD}$ are sets of radial velocities obtained from the CFD simulation of the wind flow to produce a first approximation of the velocity fields reducing a cost function of a weighted combination of errors given in equation (6).

The sets of $v_R$ denote measurements of radial (or Line-of-sight) velocities given by the remote sensing instrument of the wind flow. Such values have very small error and are used as true value of wind in the beam direction. Each term in equation (6), denoted by i, corresponds to an error due to one of the altitudes and includes a difference between measured velocities at the line-of-site points at the corresponding altitude, $v_R$, and the simulated velocities at the line-of-site points simulated by the CFD for the corresponding altitude. The weight of each error in the weighted combination of errors is an increasing function of a value of the corresponding altitude.

Some embodiments are based on realization that unknown values of the operating parameters can be estimated using a direct-adjoint looping (DAL) based CFD framework. This framework results in simultaneous correction of unknown parameters serving a common purpose by minimizing a cost function that estimates the errors in line-of-sight data and its gradients between forward CFD simulation, and available LiDAR measurements, and then solving a sensitivity (or adjoint-CFD) equation in an iterative manner. The sensitivity of the parameters serving a common purpose is indicative of the direction of convergence of the DAL based CFD framework. The simultaneous correction reduces computational time of updating multiple operating parameters.

Some embodiments denote a set of the operating parameters, which are to be estimated, by $(\xi_1, \xi_2, \ldots \xi_n)$. Then, the sensitivity of cost function J with respect to any operating parameter $\xi_i$ can be expressed as $$\frac{\delta J}{\delta \xi_i} = \frac{J(\xi_i + \delta\xi_i, \xi_1, \ldots \xi_{i-1}, \xi_{i+1}, \ldots) - J(\xi_i - \delta\xi_i, \xi_1, \ldots, \xi_{i-1}, \xi_{i+1}, \ldots)}{2\delta\xi_i} \quad \text{Equation 7}$$

Figure 10:
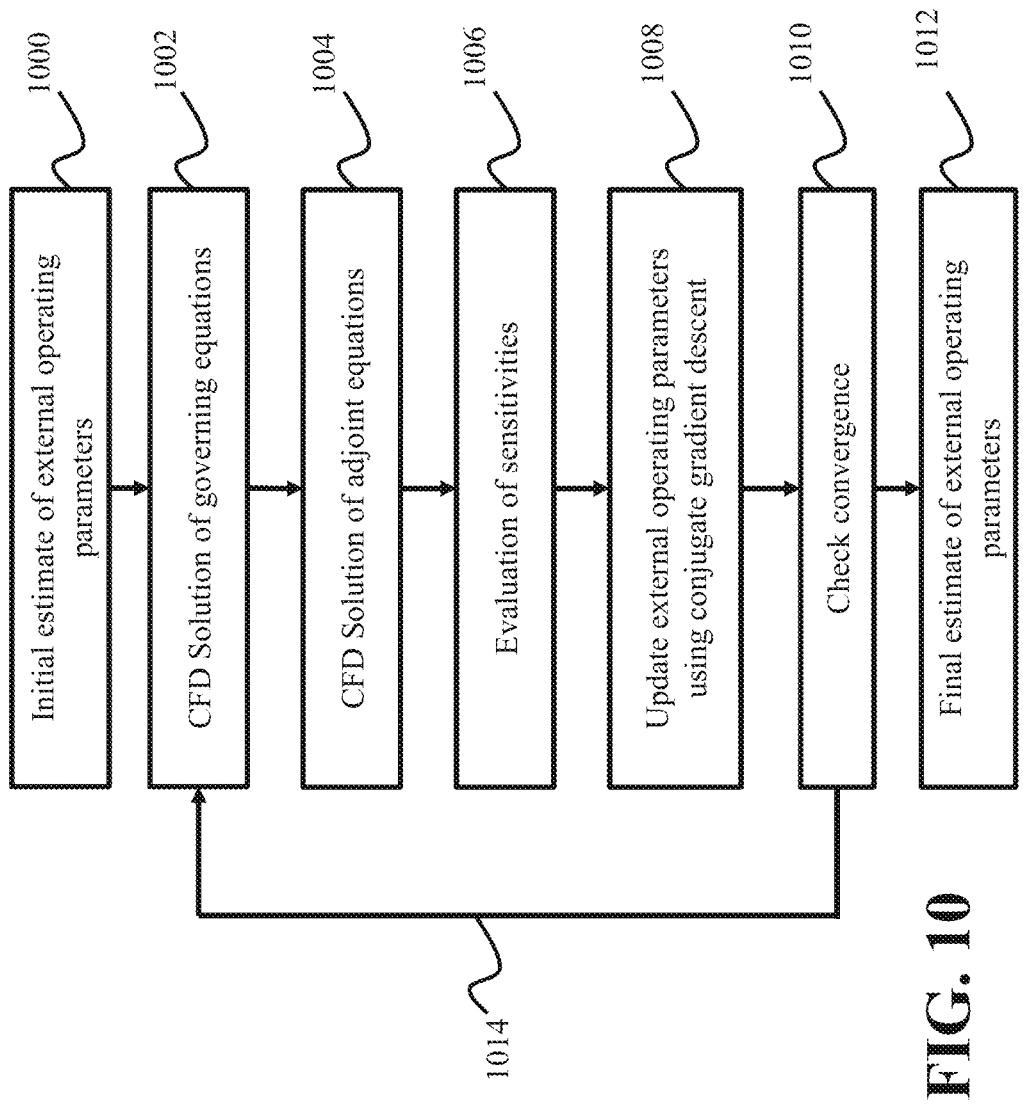
FIG. 10 shows a schematic for implementation of a direct-adjoint looping (DAL) used by one embodiment to determine the operating parameters and the results of the CFD simulation in an iterative manner.

FIG. 10 shows a schematic for implementation of the DAL used by one embodiment to determine the operating parameters and the results of the CFD simulation in an iterative manner. This embodiment estimates the most probable values of the operating parameters by evaluating the CFD simulation. The DAL is an optimization method that solves the CFD equations 1002 and the adjoint (or sensitivity) equations 1004 in an iterative 1014 manner to obtain sensitivities 1006 of a cost function with respect to the unknown operating parameters at current estimate of the operating parameters. The DAL is initialized 1000 with a guess or initial estimate of the operating parameters. For example, the inlet velocity is estimated using Bernoulli's equation and angle is estimated using homogenous assumption. After each iteration, the estimate of the current values of the operating parameters is updated using conjugate gradient descent 1008, updated in a direction of maximum decrease of the sensitivities of the cost function. To that end, the CFD simulation is performed multiple times, i.e., once per iteration, and if the change in estimate from previous iteration is below a threshold, the DAL method is considered to be converged 1010. The DAL method is obtained by formulating a Lagrangian $$L = J + \int_\Omega (p_a, V_a) N(p, V) d\Omega \quad \text{Equation 8}$$

Since N(p, V)=0 in equations (Navier-Stokes equations), equation L and J are equal when the value of p and V are accurate. Considering the variation of $\xi_i$ the variation of L can be expressed as $$\delta L = \frac{\delta L}{\delta \xi_i} d\xi_i + \frac{\delta L}{\delta V} dV + \frac{\delta L}{\delta p} dp \quad \text{Equation 9}$$

To determine the term $$\frac{\delta L}{\delta \xi_i},$$

the adjoint variables are chosen to satisfy $$\frac{\delta L}{\delta V}\delta V + \frac{\delta L}{\delta p}\delta p = 0.$$

Hence, the DAL method involves new variables $(V_a, p_a)$, which denote adjoint velocity and pressure, respectively, to make $\partial J/\partial \xi_i$ computable.

In one embodiment, the unknown parameters are chosen to be $V_{in}, \Theta_{in}$, i.e. the inlet velocity and inlet angle. Therefore, the problem of finding $V_{in}, \Theta_{in}$ that minimize J is transformed into the problem of finding $V_{in}, \Theta_{in}$ that minimize the augmented objective function L. For example, to determine $\delta J/\delta V_{in}$ and $\delta J/\delta \Theta_{in}$, the DAL approach can be used by setting $\xi_i = V_{in}$ or $\xi_i = \Theta_{in}$.

The adjoint equations in step 1030 are given by $$-V \cdot \nabla V_a + \nabla V^T \cdot V_a + \frac{1}{\rho}\nabla p_a - \nu\nabla^2 V_a = 0 \quad \text{Equation 10a}$$

$$\nabla \cdot V_a = 0 \quad \text{Equation 10b}$$

The operator $\nabla V^T$ corresponds to the transpose of the gradient of velocity vector.

Adjoint variables can be used to determine the sensitivity 1006 of cost function to any operating parameter $$\frac{\delta L}{\delta \xi_i} = \frac{\delta J}{\delta \xi_i} + \int_\Omega (p_a, V_a)\frac{\delta N(p, V)}{\delta \xi_i} d\Omega \quad \text{Equation 11}$$

For example, equation 11 can be written for the sensitivity of cost function with respect to inlet velocity $V_{in}$ as $$\frac{\delta J}{\delta V_{in}} = \int_{A_{in}} (p_a - \nu(n \cdot \nabla)V_a) dA_{in} \quad \text{Equation 12}$$

$A_{in}$: inlet area of computational domain $\Omega$ [m²]
n: unit normal vector of $A_{in}$ [m²]

By using gradient descent algorithm, the estimate of an operating parameter $\xi_i$ can be updated 1008 as $$\xi_i^{new} = \xi_i^{old} - \lambda\frac{\delta J}{\delta \xi_i} \quad \text{Equation 13}$$

$\lambda$ a positive constant representing the step size, which can be chosen using a number of standard algorithms. Using the DAL method, only equation (4) and (10) are solved once per iteration regardless of the number of unknown parameters, and hence reduce computational cost and make the optimization problem feasible to solve. This is an advantage of adjoint method over methods that determine the sensitivity of cost function by directly measuring disturbance of the cost function. After the DAL converges to produce the current values of the external operating parameters 1012, some embodiments extract the quantity of interest, i.e. the vertical velocity gradients to correct the bias errors in wind velocity reconstruction over the complex terrain, using the LiDAR line-of-sight (LOS) on the cone of measurements.

Figure 11:
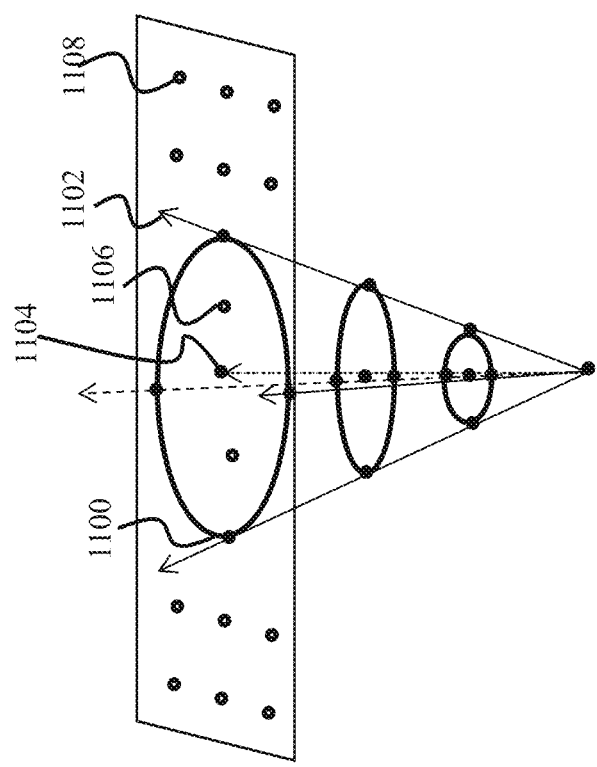
FIG. 11 shows an example of various data points on a single plane, related to the wind flow sensing, according to some embodiments.

FIG. 11 shows an example of various data points on a single plane, related to the wind flow sensing, according to some embodiments. In this example, points on circle 1100 are the points at which radial velocities 1102 are measured. In some implementations, the velocity field for each of the altitudes includes values of the velocity of the wind inside and outside of the cone, i.e., the circle 1100.

Additionally, or alternatively, in some embodiments, the horizontal derivative of vertical velocity at each of the altitudes defines a gradient of the vertical velocity at a center of the circle of the cone defining the measurements of the LiDAR for the corresponding altitude. For example, some embodiments average the velocities and/or the gradients for each altitude to produce center 1104 of the cone and the circle 1100. In those embodiments, the second approximation of the velocity field, obtained via the geometrical relationships, and the removal of the bias using the horizontal gradient of velocity, provides a single value of the velocity field on each plane (or each altitude). In such a manner, the unbiased velocity value at 1106 and 1108 are taken to be equal to that single value.

To that end, in one embodiment, the second approximation of the velocity field includes a single value of the velocity field for each of the altitudes. In addition, the embodiment transforms the single value into a dense grid of non-constant values of the velocity field at each of the altitudes by enforcing incompressibility and regularization of the wind flow consistent with measurements of radial velocities at each of the altitudes. After such a transformation, the horizontal velocities at the points inside and outside of the cone, such as the points 1102, 1104, 1106, and 1108 can have different values.

Figure 12:
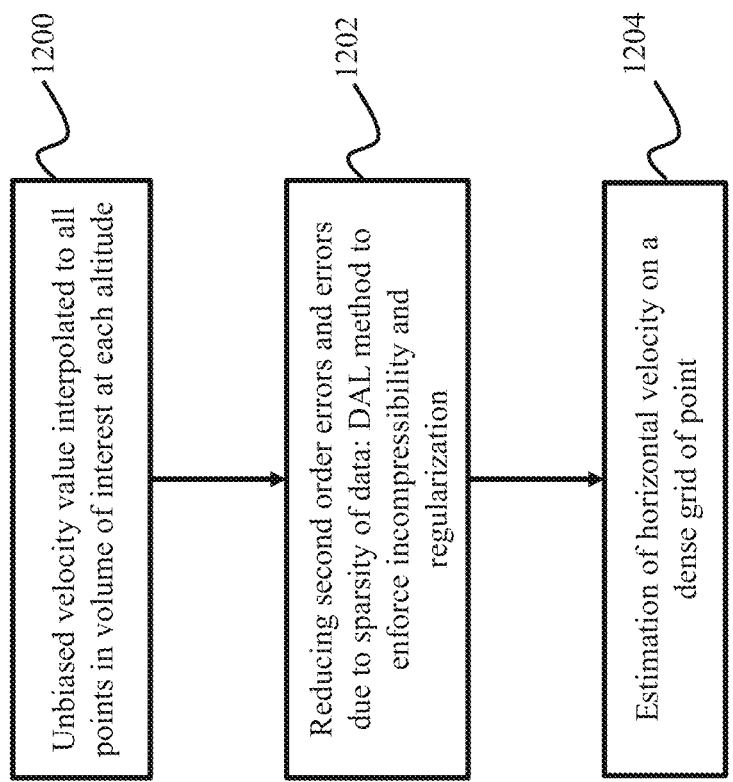
FIG. 12 shows a schematic for determining the horizontal velocities of the wind flow, according to one embodiment.

FIG. 12 shows a schematic for determining the horizontal velocities of the wind flow, according to one embodiment. The embodiment, starting with same unbiased value at all points on a single plane 1200, enforces the incompressibility of the air to reduce errors 1202 caused by sparsity of the LOS measurements and the second order errors due to the homogenous assumption to produce a dense grid of velocity values 1204. In various embodiments, the density of the grid of points is a user-specified value. Notably, in this embodiment, the incompressibility of the air is used for correcting the second order errors as contrasted with enforcing the incompressibility to correct the leading order errors due to the homogenous velocity assumption.

In some implementations, the dense grid of non-constant values of the velocity field is determined using the Direct-Adjoint-Looping based algorithm. The algorithm begins by interpolating in each plane the unbiased velocity values 1200 at all discrete points on the grid. The DAL problem is formulated to enforce incompressibility 1202 in the volume occupied by the fluid, while minimizing a cost function that has two terms: one measuring the difference between the final velocity field and the initial velocity field at discrete points, and another is a regularization term for increasing the smoothness of the velocity field. The resulting adjoint equation for adjoint variable λ is:

$$\frac{\partial^2 \lambda}{\partial^2 x^2} + \frac{\partial^2 \lambda}{\partial y^2} + \alpha^2 \frac{\partial \lambda}{\partial z^2} = -2\nabla \cdot U^k$$

where $U^k$ is the velocity field at k-th iteration of DAL loop. At end of each iteration, an update is carried out as follows:

$$U^{k+1} = U^k + 0.5 \nabla \cdot \lambda$$

The algorithm terminates when convergence is reached.

In solution of the Navier-Stokes equations, the computational cost depends on the velocity and viscosity of the fluid. For atmospheric flows, the computational cost is very large as the wind velocity is high while the viscosity of air is small. This results in so-called high Reynolds number flows for which destabilizing inertial forces within the flow are significantly larger than stabilizing viscous forces. To fully resolve fluid dynamics and to avoid numerical instability, all the spatial scales of the turbulence are resolved in a computational mesh, from the smallest dissipative scales (Kolmogorov scales), up to an integral scale proportional to the domain size, associated with motions containing most of the kinetic energy.

Large eddy simulation (LES) is a popular type of CFD technique for solving the governing equations of fluid mechanics. An implication of Kolmogorov's theory of self-similarity is that the large eddies of the flow are dependent on the geometry while the smaller scales more universal. This feature allows to explicitly solve for the large eddies in a calculation and implicitly account for small eddies by using a subgrid-scale model (SGS model). CFD simulations using LES method can simulate the flow field with high fidelity but the computational cost is very expensive.

Some embodiments are based on realization that rather than using high-fidelity CFD solutions for every new measurement data set (e.g. for every new wind direction and/or new terrain), a low-fidelity model can be modified to learn internal model parameters needed for desired accuracy in the result.

Figure 13:
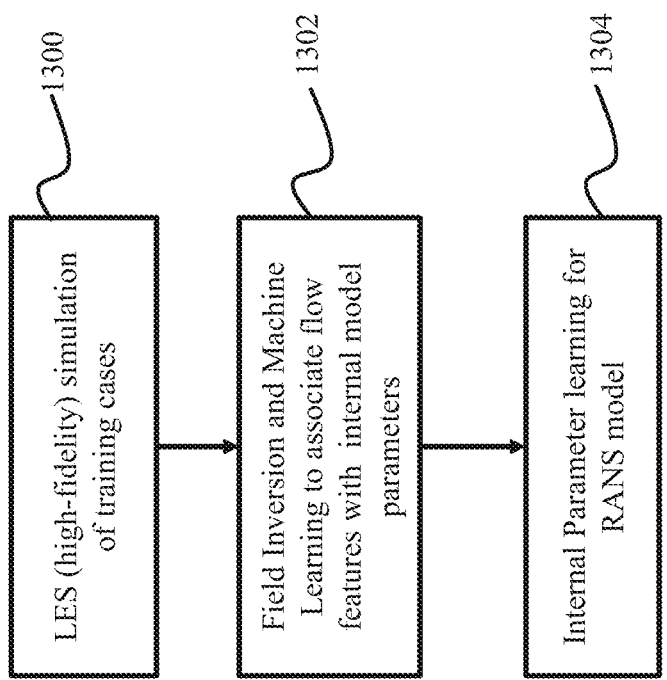
FIG. 13 shows a schematic of the CFD simulation, according to one embodiment.

FIG. 13 shows a schematic of the CFD simulation, according to one embodiment. The low-fidelity CFD simulation approximates small scale terms in the flow by a model that depends on some internal parameters. To that end, the embodiment applies Field inversion and Machine Learning (FIML) approach 1302 using feature vectors including the horizontal derivative of vertical velocity, to learn dependence of the internal parameters of low fidelity models 1303 to the flow features in the high-fidelity LES simulation 1300.

The low-fidelity CFD models, such as Reynolds-averaged Navier-Stokes equations (or RANS equations), are used. Such models are time-averaged equations of motion for the fluid flow. Additionally, such models include the internal parameters to approximate terms not being resolved due to low fidelity. The correct values of the internal parameters are problem specific, and hence to make RANS nearly as accurate as that of LES, the FIML framework is adopted. The significant advantage of using RANS in conjunction with FIML is a cost reduction of the CFD simulations for high Reynolds number by several orders of magnitude compared to the high fidelity LES simulations, while maintaining desired accuracy. Once the internal model parameters for low-fidelity model are fixed offline (in advance), RANS based CFD simulations can be performed if the operating parameters are known.

In such a manner, in some embodiments, the simulation of the CFD of the wind flow is performed by solving Reynolds-averaged Navier-Stokes (RANS) equations, while the internal operating parameters of the RANS equations are determined using a field inversion and machine learning (FIML) with feature vectors including the horizontal derivative of the vertical velocity of each of the altitude.

A relative error of the LiDAR versus cup anemometer is about 8% using the homogenous assumption for calculating the horizontal velocity, and about 1% using the CFD and DAL to find the most feasible operating parameters with focus on the inlet velocity and the wind direction. Moreover, some embodiments enforce the incompressibility assumption to reconstruct the dense field in and outside of the conical region.

To that end, it may be realized that performing the data assimilation with the CFD is very time consuming as, in the CFD simulation, the operating parameters are unknown and the operating parameters are determined iteratively until the operating parameters result into the measured radial velocities. Further, the data assimilation with the CFD is tedious as the CFD simulation is an optimization process based on solutions of the Navier-Stokes equations. Moreover, the CFD simulation becomes complex for the wind flow over the complex terrains.

Approximation of Data Assimilation

To that end, some embodiments are based on representation or approximation of the complex terrain with the convex shapes, e.g., cylinders. Some embodiments are based on recognition that the wind flow around the cylinder is qualitatively similar to that of the complex terrain.

Figure 14:
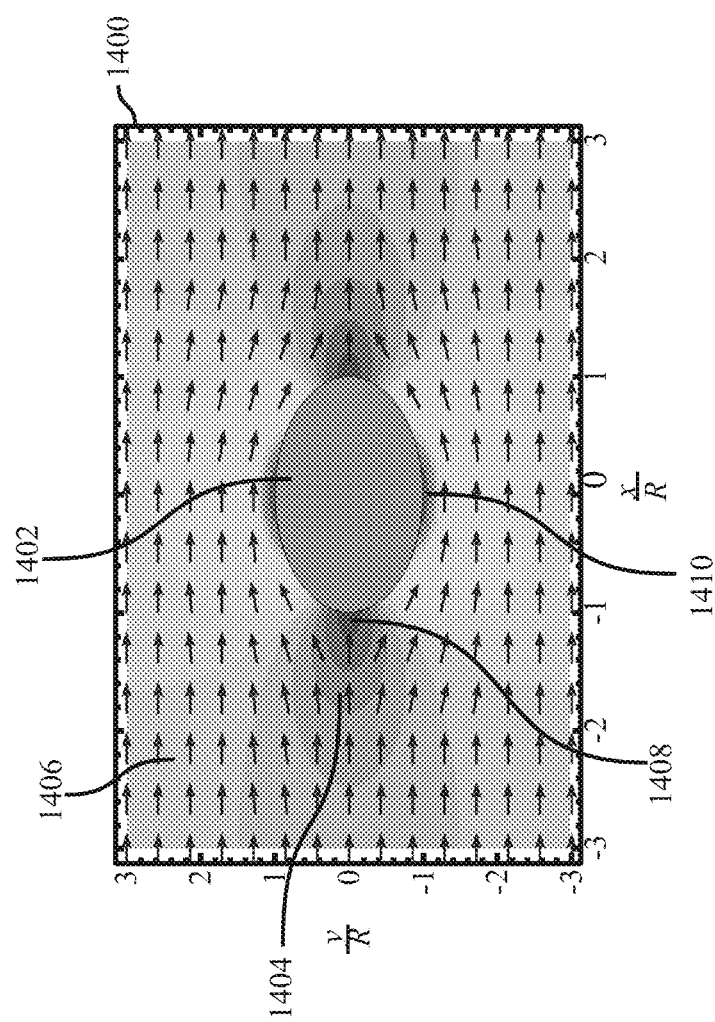
FIG. 14 illustrates a map of pressure and velocity field of the wind flow around a cylinder, according to an embodiment.

FIG. 14 illustrates a map 1400 of pressure 1404 and velocity field 1406 of the wind flow around a cylinder 1402, according to an embodiment. On surface of the cylinder 1402, the pressure varies, in particular pressure is maximum at 1408 and minimum at 1410. Due to this, the wind velocity varies resulting in non-uniform velocity field 1406. In other words, the variation/gradient of the vertical velocity in horizontal direction dw/dx also exists, which can be positive or negative (dw/dx>0 or dw/dx<0) based on the location.

In some embodiments, the wind flow around such convex shape is approximated with the potential flow. The potential flow involves the Laplacian equations as governing equations, instead of the Navier-Stokes equations as the governing equations. Therefore, the Navier-stokes equation is replaced with the Laplacian equation:

$$\frac{\partial^2 \phi}{\partial x^2} + \frac{\partial^2 \phi}{\partial y^2} = 0$$

For the potential flows, in the Laplacian equations, the velocity is expressed in terms of a velocity potential u=∇Ø. As the wind flow is incompressible, ∇·u=0 which results in $\nabla^2 \emptyset = 0$.

Since the potential flow involves algebraic solution of the Laplacian equations, for select simple shapes e.g. cylinder, rather than iterative optimization of the Navier-Stokes equations, thereby, increasing efficiency of the computation. Even the iterative solution of Laplace equation is significantly computationally cheaper than that of the Navier-Stokes.

Figure 15:
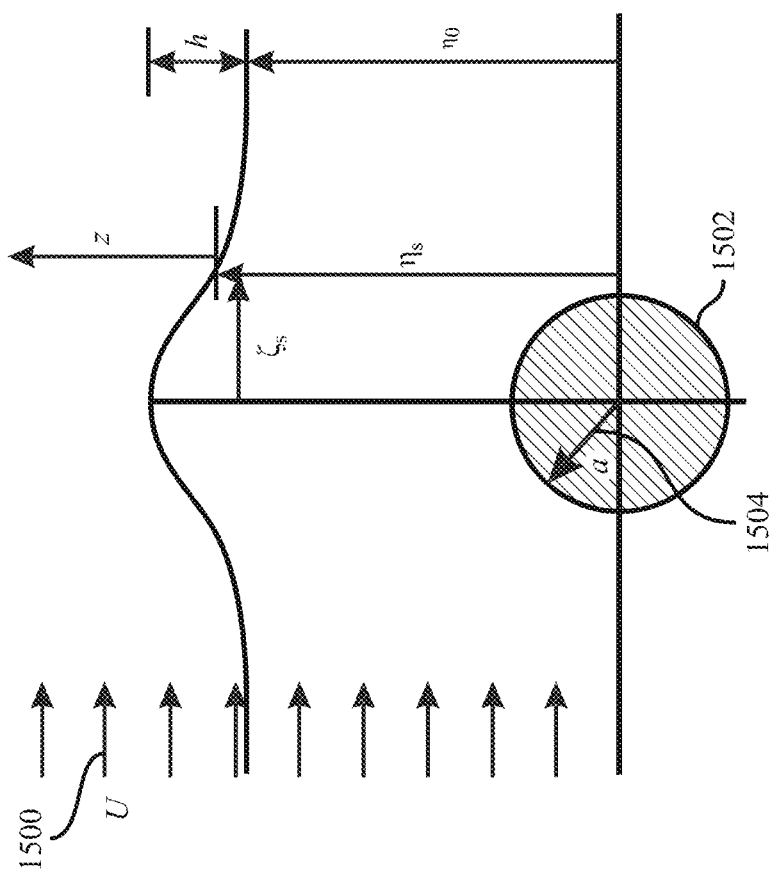
FIG. 15 shows geometry of a terrain flow model, according to an embodiment.

FIG. 15 shows geometry of a terrain flow model, according to an embodiment. A uniform horizontal wind flow 1500 of velocity U in +ζ direction is incident on a cylinder 1502. The wind velocity U may also correspond to upstream velocity. The wind flow can also be referred to as fluid flow. The cylinder 1502 is of radius 'a' 1504 and is centered at origin in a rectangular Cartesian coordinate system (ζ, y, η). The potential flow solution yields a stream function $$\psi = U\eta\left(1 - \frac{a^2}{\zeta^2 + \eta^2}\right)$$

Further, streamlines are defined by $$\eta_0 = \eta\left(1 - \frac{a^2}{\zeta^2 + \eta^2}\right).$$

The horizontal velocity components in Cartesian coordinates are given by $$u = \frac{\partial \psi}{\partial y}$$
$$v = -\frac{\partial \psi}{\partial x}$$

Some embodiments are based on recognition that, in the fluid flow, either the velocity potential or the stream function satisfying the Laplacian equation can be utilized to define the flow field. Since the Laplacian equation is linear, various solutions can be added to obtain required solutions. For example, for linear partial differential equation (such as the Laplacian equation), solutions to various boundary conditions is sum of individual boundary conditions. In the flow field, a streamline can be considered as a solid boundary as there is no flow through it. Moreover, conditions along the solid boundary and the streamline are the same. Hence, combinations of the velocity potential and the stream functions of basic potential flows leads to a particular body shape that can be interpreted as the fluid flow around that body. A method of solving such potential flow problems is referred to as superposition.

To that end, some embodiments are based on recognition that the potential flow around the cylinder can be determined by the combination of the velocity potential and the stream function of the basic potential flows. The basic potential flows include uniform flow, source/sink flow, doublet flow and the like.

Figure 16:
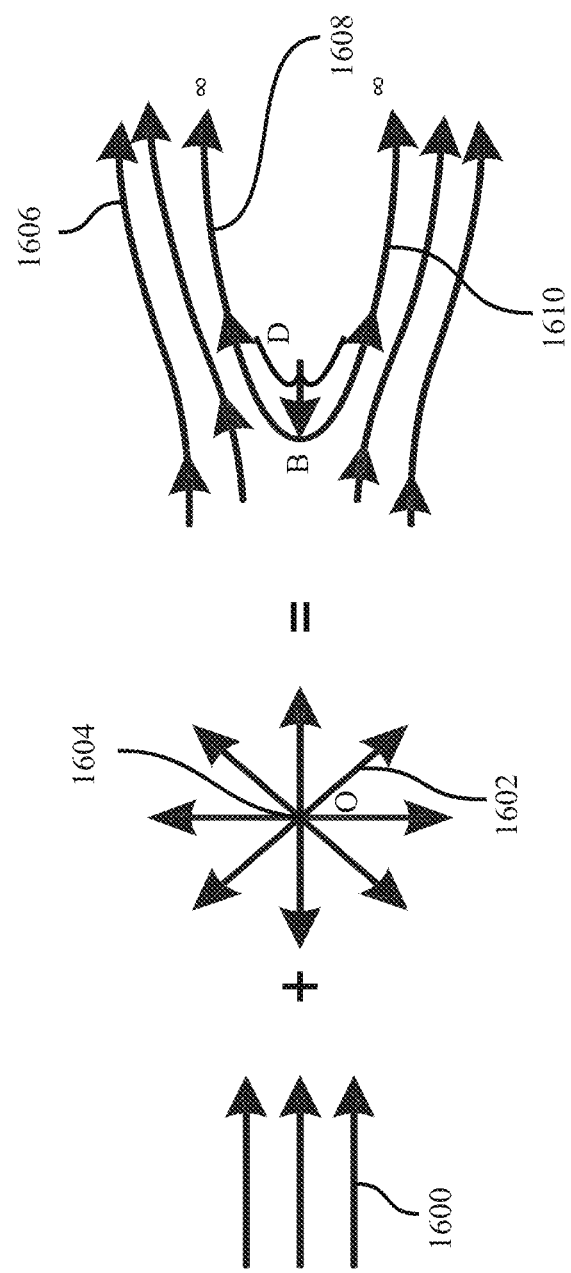
FIG. 16 illustrates a combination of a uniform flow and a source flow, according to an embodiment.

FIG. 16 illustrates a combination of a uniform flow 1600 and a source flow 1602, according to an embodiment. The uniform flow 1600 is uniform stream with velocity $V_\infty$. The uniform flow 1600 can be defined with a potential function $$\varphi = V_\infty r \cos(\theta) \qquad \text{Equation 14}$$

Resulting stream function for the uniform flow 1600 is given as $$\Psi_{uniform} = V_\infty r \sin(\theta) \qquad \text{Equation 15}$$

In a fluid flow, where all the streamlines are straight lines converging or diverging from a central point O 1604, the flow is referred to as a sink flow if the flow is converging to the central point O 1604. Conversely, if the flow is diverging from the central point 1604, the flow is referred to as the source flow 1602. The resulting velocity field of the aforesaid flows includes a radial component $V_r$, which is inversely proportional to a distance from the point O. The potential flow and stream function for the source flow 1602 are given as $$\varphi = \frac{\Lambda}{2\pi} \ln(r) \qquad \text{Equation 16}$$

$$\Psi_{source} = \frac{\Lambda}{2\pi}(\theta) \qquad \text{Equation 17}$$

where Λ is source strength, which is a rate of volume flow from the source, and r is the distance from O. A positive Λ value refers to the source flow 1602, whereas a negative Λ value refers to the sink flow.

Further, the source flow 1602 of strength Λ is superposed with the uniform flow 1600 to result in a combined flow 1606. The resulting stream function can be given as, $$\Psi = \Psi_{uniform} + \Psi_{source} = V_\infty r\sin(\theta) + \frac{\Lambda}{2\pi}(\theta) \quad \text{Equation 18}$$

The streamlines of the combined flow 1606 leads to the fluid flow over a semi-infinite body/shape, and are obtained as $$\Psi = V_\infty r\sin(\theta) + \frac{\Lambda}{2\pi}(\theta) = \text{constant}$$

The velocity field is obtained from the stream function through differentiation in polar coordinates i.e.

$$v_r = \frac{1}{r}\frac{\partial \psi}{\partial \theta} = V_\infty \cos\theta + \frac{\Lambda}{2\pi r}; v_\theta = -\frac{\partial \psi}{\partial r} = -V_\infty \sin\theta$$

In the combined flow 1606, the flow is stagnant at a point as the velocity due to the source flow 1602 cancels with that of the uniform flow 1600. Some embodiments are based on a recognition that streamline 1608 contains the stagnation point at 'B' and separates the flow from the uniform flow 1600 and the flow emanating from the point 1604. The fluid flow outside the streamline 1608 is from the uniform flow 1600 while the fluid flow inside the streamline 1608 is from the source flow 1602. In the fluid flow, the velocity at the surface of the body is tangent to the body. To that end, some embodiments are based on realization that any streamline of the combined flow 1606 can be replaced by a solid surface of same shape. Hence, with respect to the uniform flow 1600, the flow is not distorted if the streamline 1608 is replaced with the solid body. The streamline 1608 extends downstream to infinity, forming the semi-infinite body and is called as Rankine Half-Body 1610.

Therefore, it may be realized that the flow over the semi-infinite body can be determined by the combination of the uniform flow 1600 with the source flow 1602. Some embodiments are based on a realization that a model of the fluid flow around the cylinder can be obtained by a combination of the uniform flow and a doublet flow.

Figure 17A:
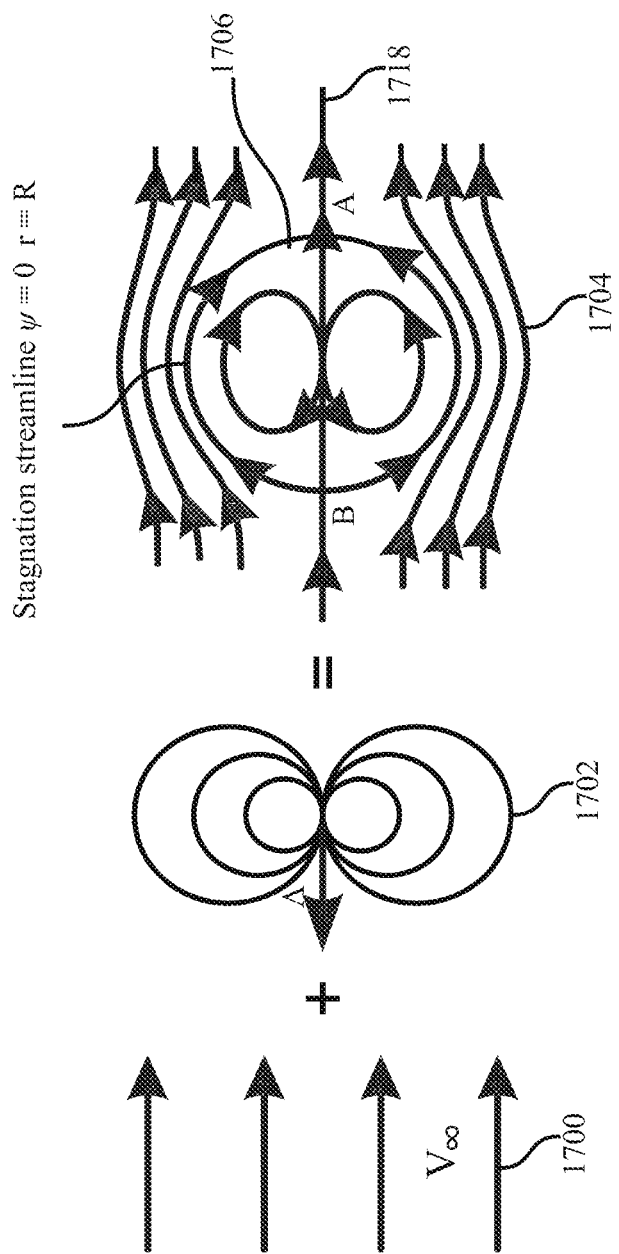
FIG. 17A illustrates a combination of the uniform flow with a doublet flow to determine the fluid flow around a cylinder, according to some embodiments.

FIG. 17A shows the combination of a uniform flow 1700 with a doublet flow 1702 to determine the fluid flow around the cylinder, according to some embodiments. According to an embodiment, the doublet 1702 is obtained by superposing the source flow and the sink flow of equal strength.

Figure 17B:
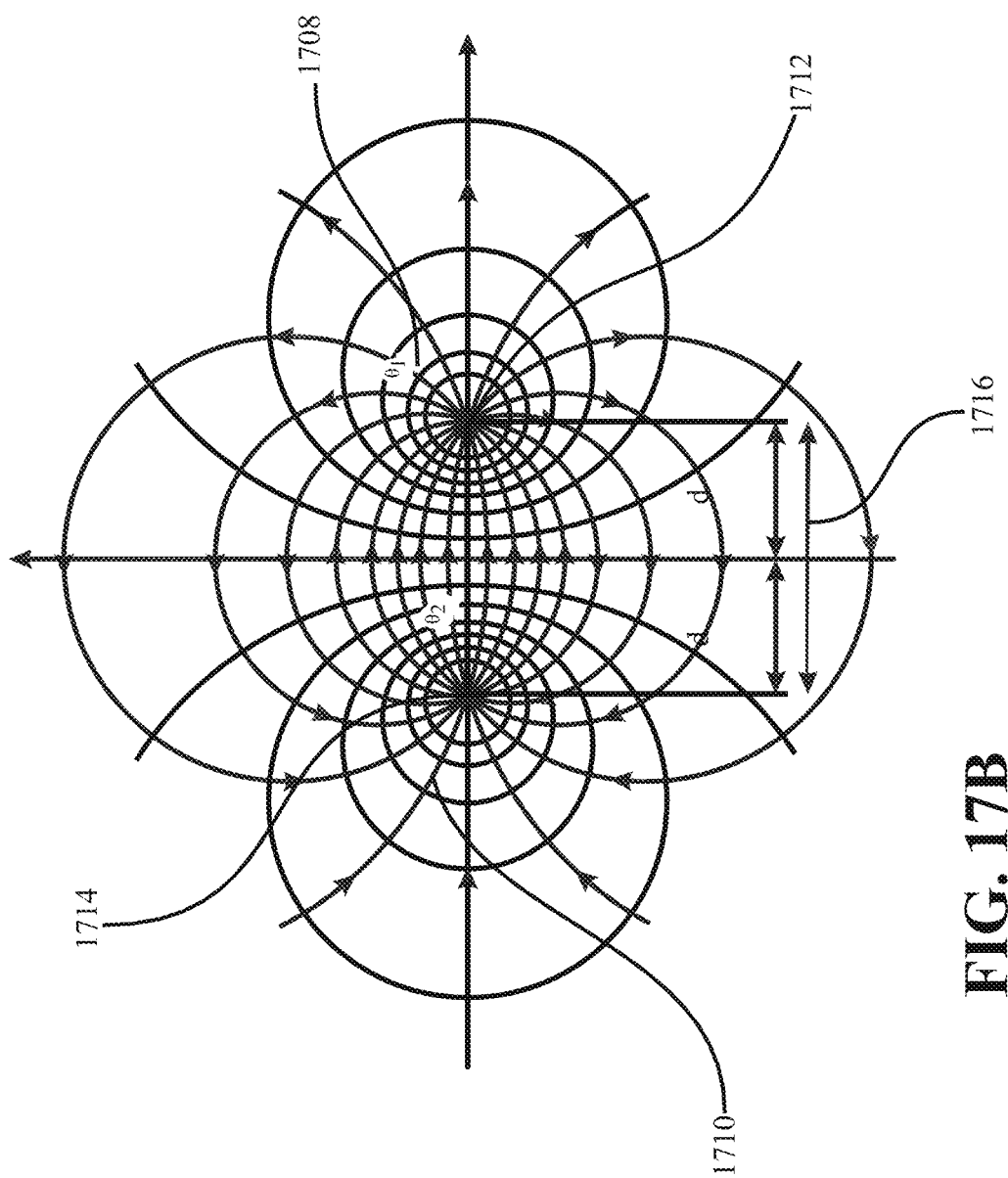
FIG. 17B shows the source flow and a sink flow of equal strength $\Lambda$ for obtaining the doublet flow, according to an embodiment.

FIG. 17B shows a source flow 1708 and a sink flow 1710 of equal strength Λ for obtaining the doublet flow 1702, according to an embodiment. The source flow 1708 is originating from a point 1712 and the sink flow is converging towards a point 1714. The source flow 1708 and the sink flow 1710 are separated by a distance 2*d* 1716. As the distance between source-sink pair (1708 and 1710) approaches zero, the doublet flow 1702 is formed. The velocity potential and stream function of the doublet flow 1702 are given by equations $$\varphi = \frac{\Lambda}{2\pi r}\cos(\theta) \quad \text{Equation 19}$$

$$\Psi_{doublet} = -\frac{\Lambda}{2\pi r}\sin(\theta) \quad \text{Equation 20}$$

The doublet flow 1702 is superposed with the uniform flow 1700 to obtain a combined flow 1704. The stream function for the combined flow 1704 is given by $$\psi = \psi_{uniform} + \psi_{doublet} = V_\infty r\sin\theta - \frac{\Lambda}{2\pi}\left(\frac{\sin\theta}{r}\right) = \quad \text{Equation 21}$$

$$V_\infty r\sin\theta\left(1 - \frac{\Lambda}{2\pi V_\infty r^2}\right) \Rightarrow \psi = V_\infty r\sin\theta\left(1 - \frac{R^2}{r^2}\right);$$

$$R = \frac{\Lambda}{2\pi V_\infty}$$

Further, the velocity field is obtained as $$v_r = \frac{1}{r}\frac{\partial \psi}{\partial \theta} = \left(1 - \frac{R^2}{r^2}\right)V_\infty\cos\theta; \quad \text{Equation 22}$$

$$v_\theta = -\frac{\partial \psi}{\partial r} = -\frac{\partial \psi}{\partial r} = -\left(1 + \frac{R^2}{r^2}V_\infty\sin\theta\right)$$

In some embodiments, velocity components in Eq. (22) are assigned to zero and simultaneously solved for r and θ, to locate the stagnation point. In the combined flow 1704, the stagnation points are located at (r, θ)=(R, 0) and (R, π), which are denoted by points A and B, respectively. An equation of streamlines that passes through the stagnation points A and B, is given $$\Psi = V_\infty r\sin(\theta)\left(1 - \frac{R^2}{r^2}\right) = 0 \quad \text{Equation 23}$$

Equation (23) is satisfied by r=R for all values of θ. Since R is constant, Eq. 23 may be interpreted as the equation of a circle with radius R with center at the origin. It is satisfied by θ=0 and π for all values of R. To that end, a horizontal axis 1718 through the points A and B, extending infinitely far upstream and downstream, is a part of stagnation streamline.

In the combined flow 1704, dividing streamline is a circle of radius R 1706. Different values of R may be obtained by varying the uniform velocity and/or doublet strength. The flow inside the circle 1706 is generated from the doublet flow 1702, whereas the flow outside the circle 1706 comes from the uniform flow 1700. Therefore, the flow inside the circle may be replaced by the solid body (cylinder) without distorting the flow outside the circle 1706. Thus, the fluid flow over the cylinder of radius R can be simulated by adding the uniform flow 1700 of velocity $V_\infty$ and the doublet flow 1702 of strength Λ, and R is related to $V_\infty$ and Λ as $$R = \frac{\Lambda}{2\pi V_\infty}$$

Additionally, multiple basic potential flows, such as the uniform flow, the source/sink flow, the doublet flow and the like, can be used to approximate the fluid flow over a complex shape.

Some embodiments are based on objective of determining a mapping between the cylinder and the complex shape (e.g., the complex terrain). In some embodiments, such mapping can be determined by using conformal mapping which includes analytical mapping of complex numbers. In the conformal mapping, a transformation function is used for transformation of a complex valued function from one coordinate system to another. In some other embodiments, the mapping between the cylinder and the complex shape is determined based on machine learning methods.

For example, one technique involves "training" the machine learning program on the converged CFD data for a variety of shapes and complex terrains that are representative of typical sites. More than hundreds of such simulations maybe required for the training. Once the program is trained, a process, for example, using Gaussian Process regression, or deep learning techniques, is utilized to infer the velocities and pressures, as well as the horizontal gradient of vertical velocity, for a new complex terrain shape based on all of the previous complex terrain shapes. In next step, for each shape, an equivalent radius for single or multiple cylinders can be determined using, for example, DAL method to solve the inverse problem. Such solution to the optimization problem can be used for the training. Once a new complex terrain is encountered, the trained regression equation can be used to determine the equivalent radius.

Figure 18:
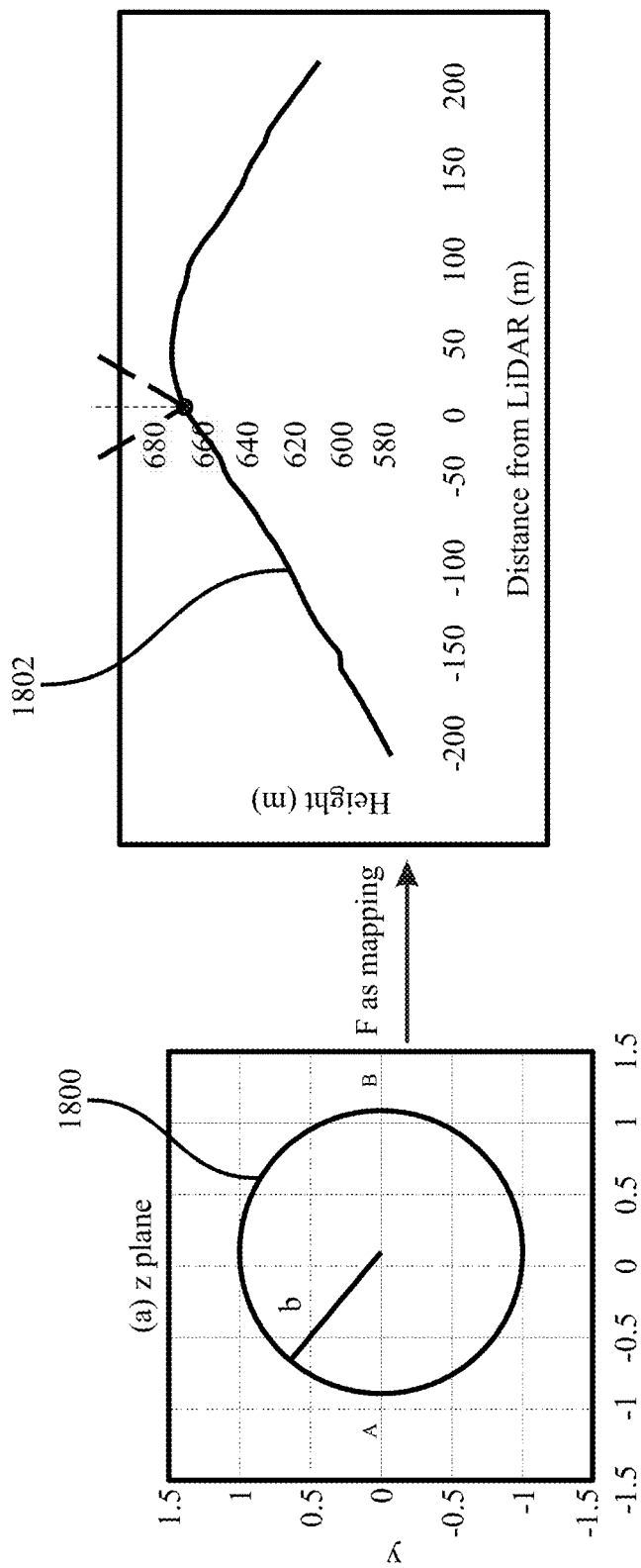
FIG. 18 shows an exemplary mapping between the cylinder of radius b and a terrain, according to some embodiments.

FIG. 18 shows an exemplary mapping between a cylinder of radius b and a terrain, according to some embodiments. An example of such conformal mapping is Joukowski airfoils, which refers to the solutions of the potential flows past a family of airfoil shapes. The procedure includes finding a mapping that transforms the cylinder into an airfoil shape. Such mapping is called conformal mapping. In mathematics, a conformal map is a function that locally preserves angles, but not necessarily lengths. The transformation is conformal whenever Jacobian at each point is a positive scalar multiplied by a rotation matrix (orthogonal with determinant one). Some embodiments define conformality to include orientation-reversing mappings whose Jacobians can be written as any scalar times any orthogonal matrix.

Some embodiments are based on a recognition that a set of convex shapes (cylinders) can be superposed for mapping with the complex terrain or approximating the complex terrain.

Figure 19:
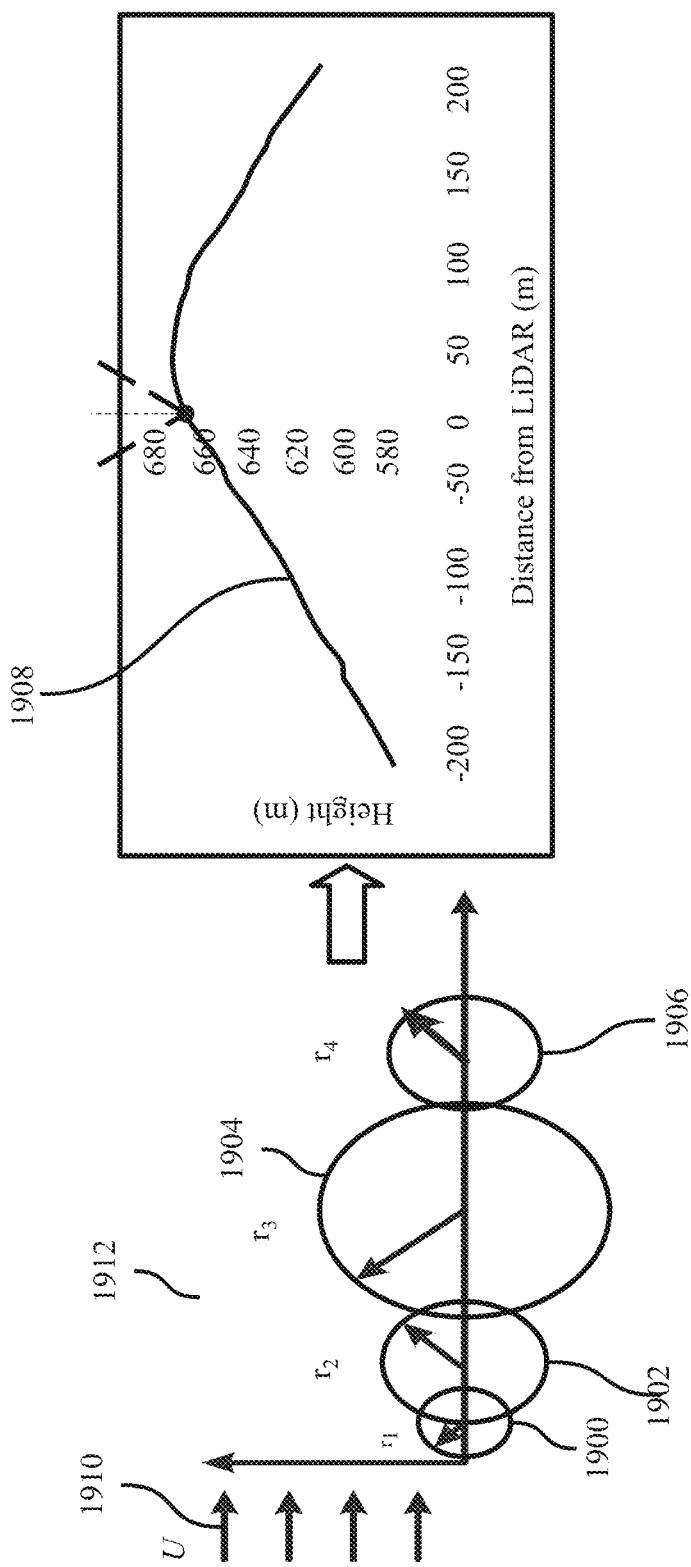
FIG. 19 shows superposition of a set of cylinders for mapping with the terrain, according to some embodiments.

FIG. 19 shows superposition of a set of cylinders 1900, 1902, 1904 and 1906 for mapping with a terrain 1908, according to some embodiments. The cylinders 1900, 1902, 1904 and 1906 are of radius $r_1$, $r_2$, $r_3$ and $r_4$, respectively. The aforesaid cylinders are superposed to form a superposed shape 1912 or a distribution of the cylinders. The radius of the aforesaid cylinders is determined such that the line of sight velocities of Laplace flows of those cylinders is closest to the measurements.

The radius of cylinders $r_1$, $r_2$, $r_3$ and $r_4$, are unknown. Also, the velocity U of wind 1910 is unknown. In some embodiments, the velocity U may correspond to an upstream velocity. Some embodiments are based on recognition that the radius of cylinders $\{r_i\}_{i=1}^{i=N}$ with N as the number of cylinders and the velocity U can be determined by an adjoint method. The determination of radius of cylinders and the velocity U is explained in detail with reference to FIG. 21.

Figure 20:
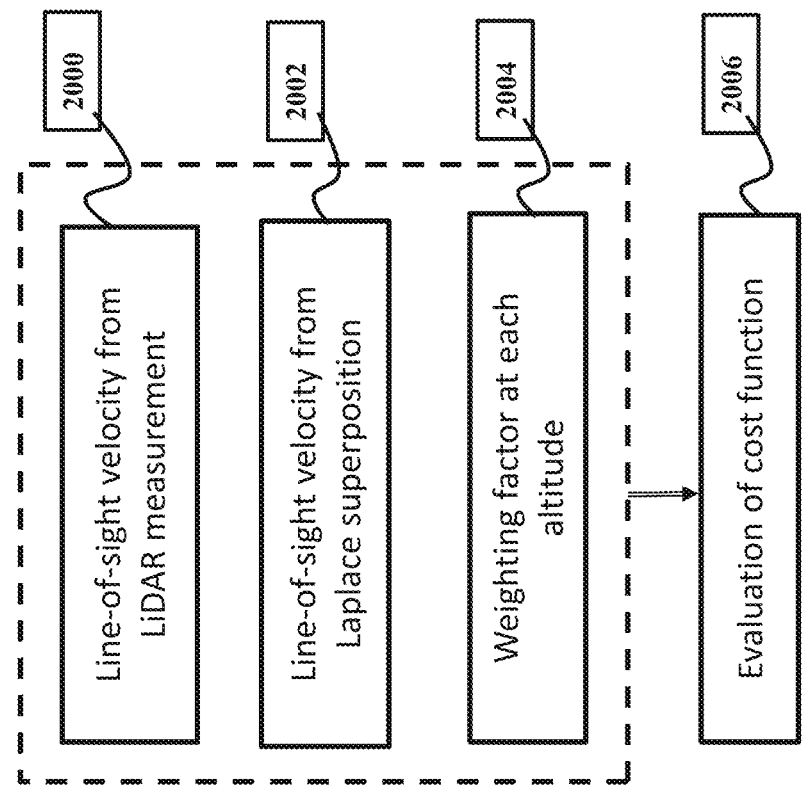
FIG. 20 shows a schematic of constructing and evaluating a cost function that includes both the LOS measurements and LOS from Laplace superposition, according to some embodiments.

FIG. 20 shows a schematic of constructing and evaluating a cost function that includes both the LOS measurements and LOS from the Laplace superposition simulation according to some embodiments. Having line-of-sight velocities 2000 from LiDAR measurement and line-of-sight velocity from Laplace superposition 2002, the cost function evaluation yields a numerical value representing how well the line-of-sight velocity from the Laplace superposition 2002 matches with the line-of-sight velocity from the LiDAR measurements 2000 along the line of sight of different beams at various altitudes. The weighting factor 2004 is selected such that each altitude correction term is proportional to the amount of bias. One example is to use the elevation above the LiDAR as such weighting, since the bias becomes higher at higher elevations. The cost function is evaluated using a lightweight method of multiple cylinders which includes analytical solution. Therefore, as no partial differential equations (PDE) or differential equations are solved numerically, the computation time is significantly reduced, which in turn allows online reconstruction of wind or online estimation of the horizontal velocities at each of the altitudes.

Figure 21:
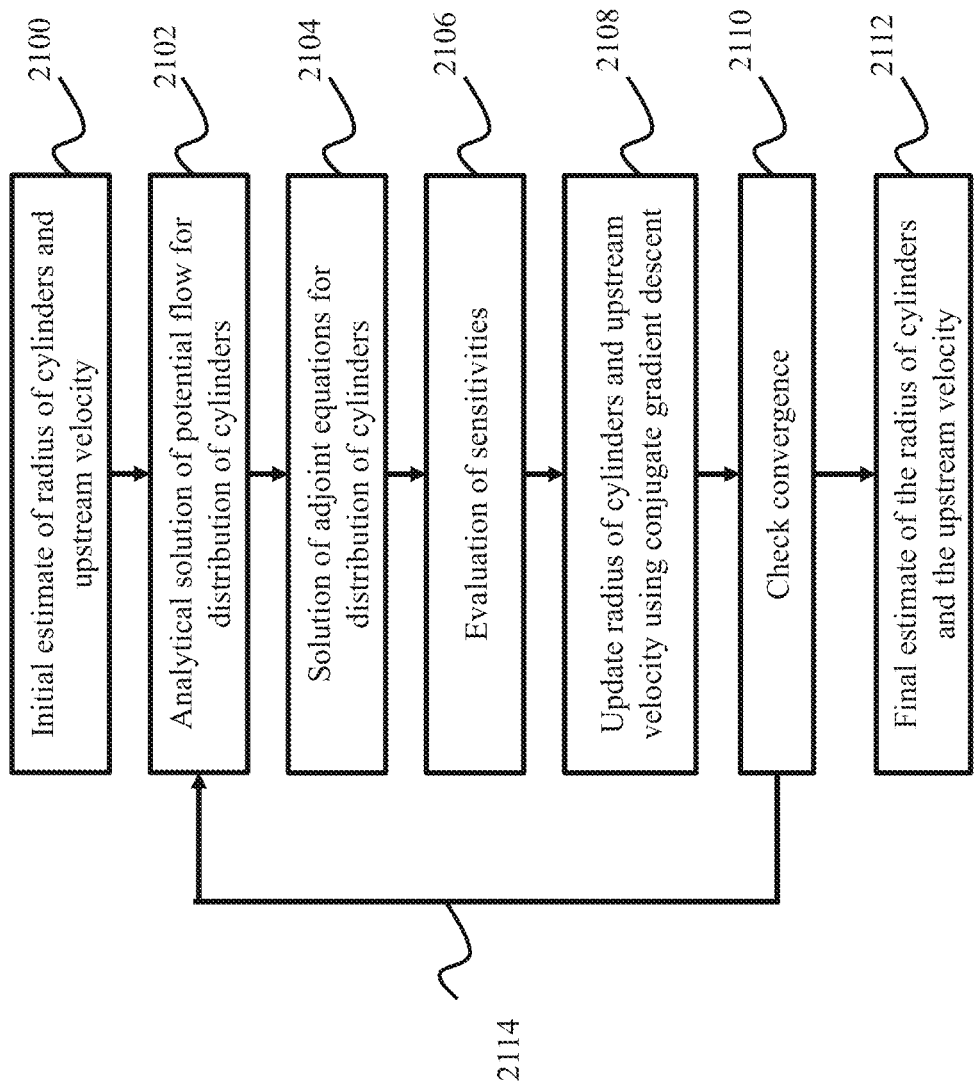
FIG. 21 shows a block diagram for implementation of the DAL to determine radius of cylinders and upstream velocity, according to some embodiments.

FIG. 21 shows a block diagram for implementation of the DAL to determine the radius of cylinders and the upstream velocity U, according to some embodiments. This embodiment estimates the most probable distribution of cylinders and the upstream velocity by minimizing a cost function. The DAL method is initialized 2100 with an initial estimate of the radius of cylinders and the upstream velocity. Here, the DAL is an optimization method that includes analytical solution of the potential flow for the distribution of cylinders 2102 and the adjoint (or sensitivity) equations 2104 in an iterative 2114 manner. Such optimization provides sensitivities 2106 of the cost function with respect to the unknowns i.e. the radius of cylinders and the upstream velocity at current estimate of the unknowns. After each iteration, the estimate of current values of the radius of cylinders and the upstream velocity is updated using conjugate gradient descent 2108. According to some embodiments, updating the current estimate of the unknowns using the conjugate gradient descent involves updating in a direction of maximum decrease of the sensitivities of the cost function.

Further, a convergence criterion is checked 2110. An example of such convergence criterion is the variation of the cost function between successive iterations. Another example is a change in estimate from a previous iteration is below a threshold. If the convergence criterion is not met, then next iteration is instigated in which the analytical solution of the potential flow for distribution of cylinders 2102 is determined. In the event, the convergence criterion is satisfied, final estimation of the radius of cylinders and the upstream velocity is obtained 2112.

Figure 22:
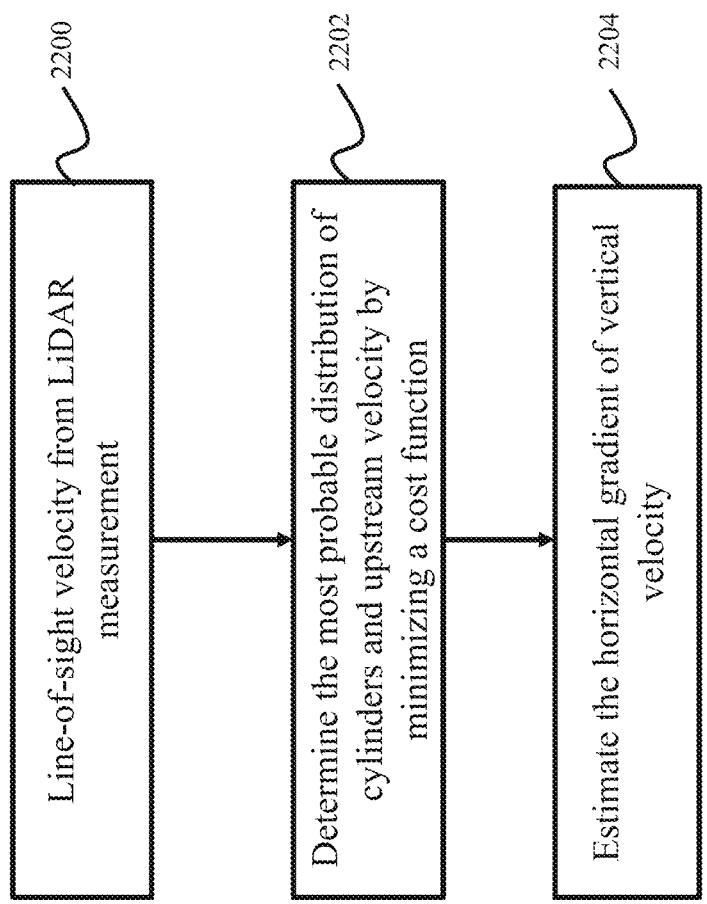
FIG. 22 shows a schematic of estimation of the horizontal gradient of vertical velocity, according to some embodiments.

FIG. 22 shows a schematic of estimation of the horizontal gradient of vertical velocity, according to some embodiments. The line of sight velocity from the LiDAR measurements is obtained 2200. Further, the most probable distribution of cylinders and the upstream velocity are determined 2202 using the line of sight velocity from the LiDAR measurements 2200. In some embodiments, the most probable distribution of cylinders and the upstream velocity are determined by minimizing of a cost function 2202. For example, the minimization of the cost function can be performed iteratively based on a sensitivity of the cost function. Based on the determined distribution of cylinders and the upstream velocity, the horizontal gradient of vertical velocity can be estimated 2204.

Turbulence of the Wind Flow

Figure 23A:
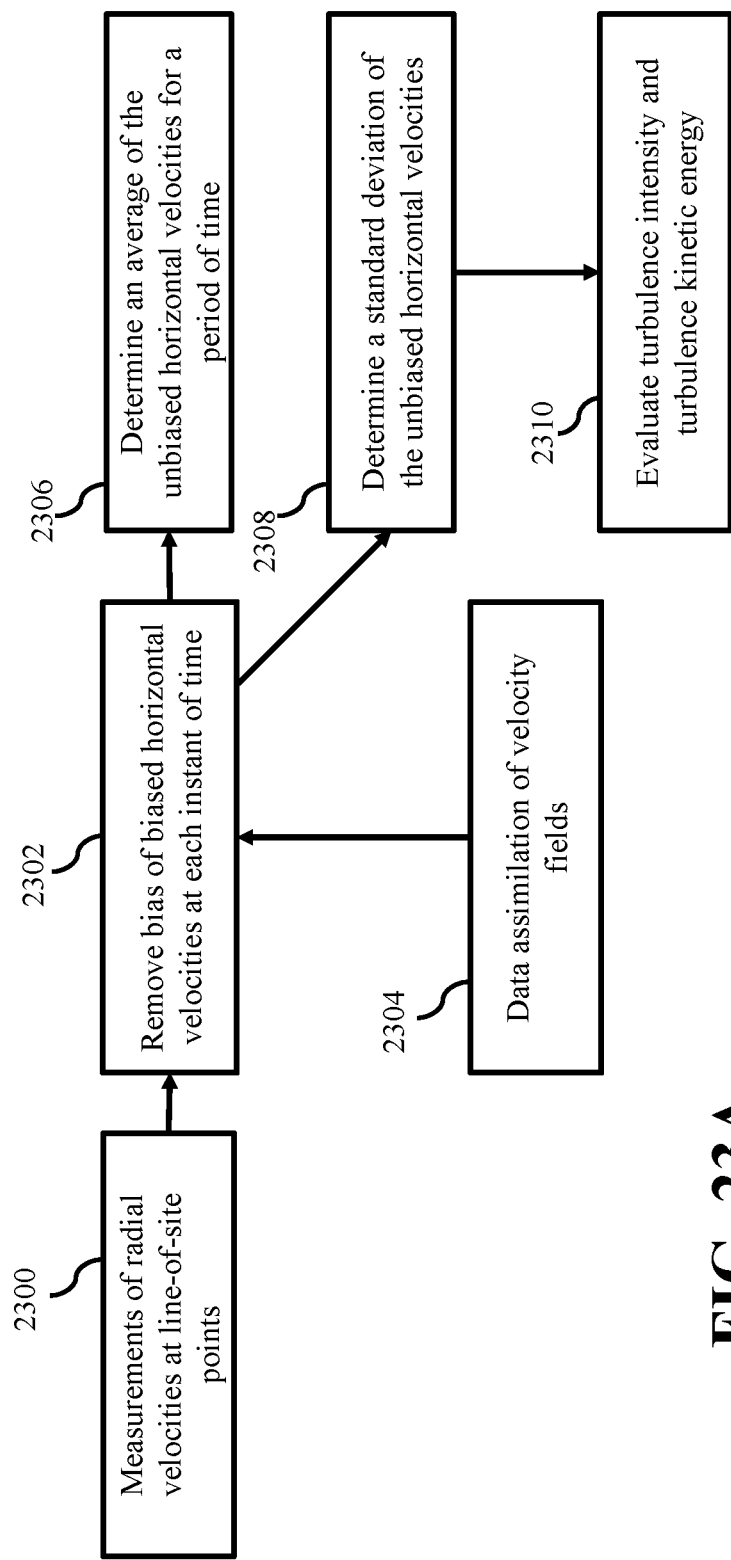
FIGS. 23A and 23B collectively shows schematic overview of principles used by some embodiments for wind flow turbulence measurement in the complex terrain.
Figure 23B:
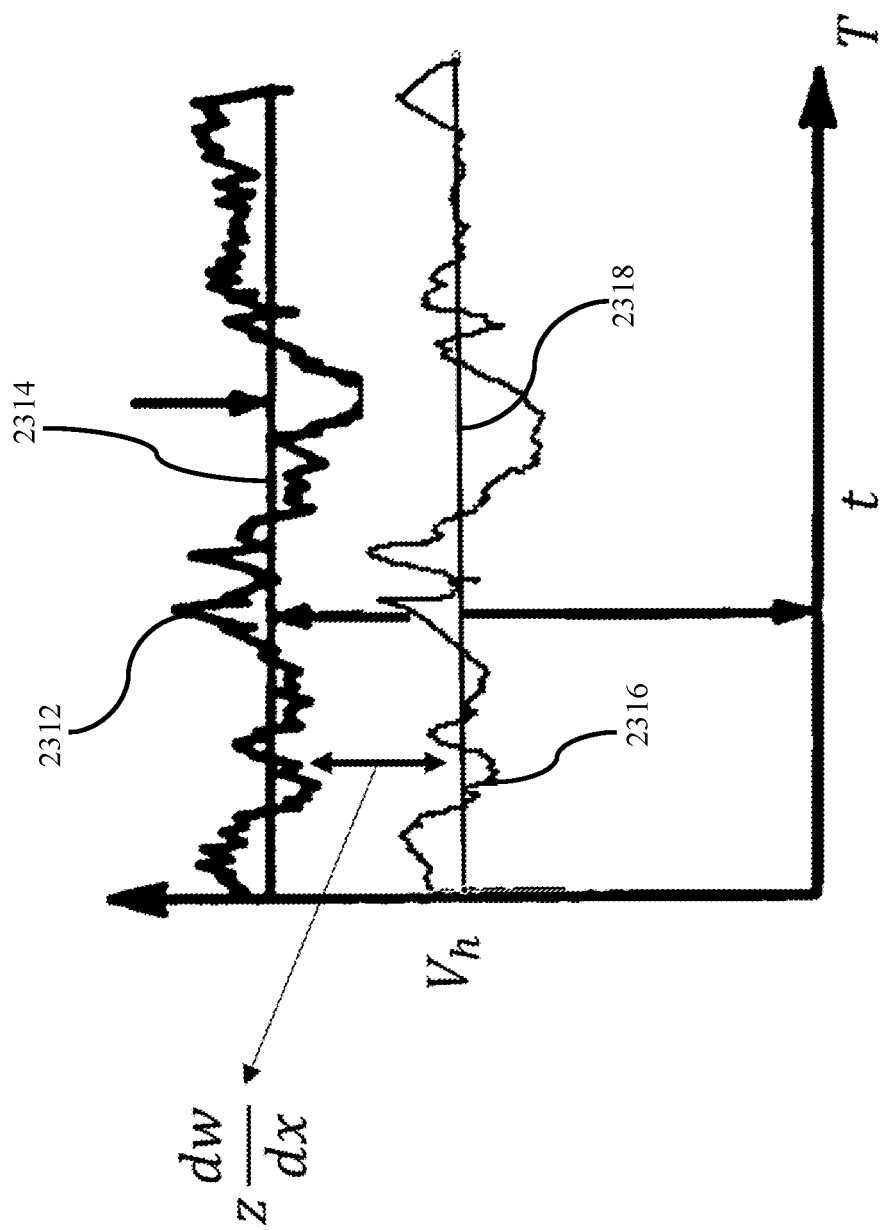

FIGS. 23A and 23B collectively shows schematic overview of principles used by some embodiments for wind flow turbulence measurement in the complex terrain. The remote sensing instruments, such as LiDAR is used for measuring radial velocities 2300 of the wind in line of sight (LOS) points for each of the altitudes for a set of time steps.

However, turbulence quantities related to the horizontal velocity are parameters of interest.

To that end, some embodiments aim to determine the turbulence quantities related to the horizontal velocity of the wind flow for each of the altitudes. Some embodiments are based on recognition that an estimate of the horizontal velocity at a time step can be determined from the measurements of the radial velocity 2300 corresponding to the time step, using a geometrical relationship and assuming that the wind velocity is homogenous on each plane inside a cone of measurements. A signal 2312 in FIG. 23B represents an exemplary plot of such horizontal velocities estimation for different time instants. Further, the horizontal velocities are averaged for a period of time, for example, 10 minutes. A horizontal line 2314 shown in FIG. 23B represents the average of the horizontal velocities for the period of time. The horizontal velocities 2312 and the average 2314 of the horizontal velocities are different at each instant of time. The square of difference between the horizontal velocities 2312 and the average 2314 is referred to as standard deviation. According to some embodiments, the standard deviation over the average of the horizontal velocities defines turbulence intensity (TI). The turbulence intensity is defined for the period of time (e.g., 10 minutes). To that end, some embodiments are based on realization that the turbulence intensity is a function of the signal 2312 shape and the corresponding values, and, thus, the turbulence intensity depends on instantaneous value of the horizontal velocity.

However, the homogeneous velocity assumption considered for the horizontal velocity estimation is invalid for the wind flow over complex terrain such as hills, or near large building or other urban structures. Some embodiments are based on recognition that, for the complex terrains, the homogenous velocity assumption leads to a bias in the estimation of horizontal velocities. Such bias in the estimation of horizontal velocities results biased horizontal velocities, which in turn introduces bias in the standard deviation. The bias is due to variation of the vertical velocity in a vertical direction. According to an embodiment, the bias is given by height times horizontal gradient of the vertical velocity i.e.

$$z\frac{dw}{dx}.$$

Some embodiments are based on a realization that the horizontal derivatives of vertical velocities can be used as correction on the biased horizontal velocities, to remove the bias 2302. The horizontal derivatives of vertical velocities are determined by estimating velocity fields. The velocity fields are estimated for each instant of time based on data assimilation 2304 to fit the measurements of radial velocities 2300. According to some embodiments, the data assimilation is performed by simulating the computational fluid dynamics (CFD) of the wind flow. Such data assimilation is explained with reference to FIG. 5A to FIG. 13. According to some other embodiments, the data assimilation is performed by analytical fluid mechanics approximation using the potential flow approximation, which is explained in detail with reference to FIG. 14 to FIG. 22.

Such bias removal is carried out for the horizontal velocities 2312 at each instant of time to obtain corresponding unbiased horizontal velocities 2316 for respective time instants. In other words, instantaneous bias removal is performed to obtain the unbiased horizontal velocities for each instant of time. Further, an average of the unbiased horizontal velocities 116 for the period of time is determined 2306. The average of the unbiased horizontal velocities is represented by a horizontal line 2318 in FIG. 23B. The standard deviation is determined 2308 as the square of difference between the unbiased horizontal velocities 2316 and the average 2318 of the unbiased horizontal velocities. Since the standard deviation is determined 2308 based on the unbiased horizontal velocities, the bias existed in the standard deviation due to the biased horizontal velocities is eliminated. This in turn increases accuracy of the standard deviation.

According to some embodiments, the turbulence quantities, such as turbulence intensity (TI) and turbulence kinetic energy (TKE), are determined based on the unbiased horizontal velocities for each time step and the average of the unbiased horizontal velocities.

The component of wind velocity u can be given as $$u=\bar{u}+u' \qquad \text{Equation 23}$$

where $\bar{u}$ is the average velocity i.e.

$$\bar{u} = \frac{1}{T}\int_T$$

u dt for a period of time T. In an embodiment, T=10 minutes which results a 10-minutes averaged velocity. u' is fluctuation velocity. Here, u is instantaneous velocity. The rms value is given as $$u_{rms}=\sqrt{\overline{u'^2}} \qquad \text{Equation 24}$$

The equation 23 can be written, similarly, for other velocity component (for example, v) and/or the horizontal velocity $v_h$.

The turbulence intensity (TI) is determined 2310 according to a ratio of root-mean-square of turbulent velocity fluctuations over the average unbiased horizontal velocities. TI is given by $$TI = \frac{u_{rms}}{\text{average of unbiased horizontal velocities}}$$

The turbulence kinetic energy (TKE) is the standard deviation of each component of the wind velocity, and given as $$TKE=u_{rms}+v_{rms}$$

Since the turbulence quantities are determined using the unbiased horizontal velocities obtained by instantaneous bias removal, and the average of the unbiased horizontal velocities, as opposed to using the biased horizontal velocities, the accuracy of the turbulence quantities is significantly improved.

Some embodiments are based on recognition that a relationship between the standard deviation of different points on the scanning circle at a certain height can be established by formulating a function, namely, an auto-correlation function. The auto-correlation function is also referred to as a correction function. Therefore, the auto-correlation function relates the standard deviation of various points and can be used to measure the standard deviation of the estimated horizontal velocity to yield the turbulence. Some embodiments are based on recognition that the correction function can be used to correct the unbiased horizontal velocities before estimating the turbulence.

Figure 24A:
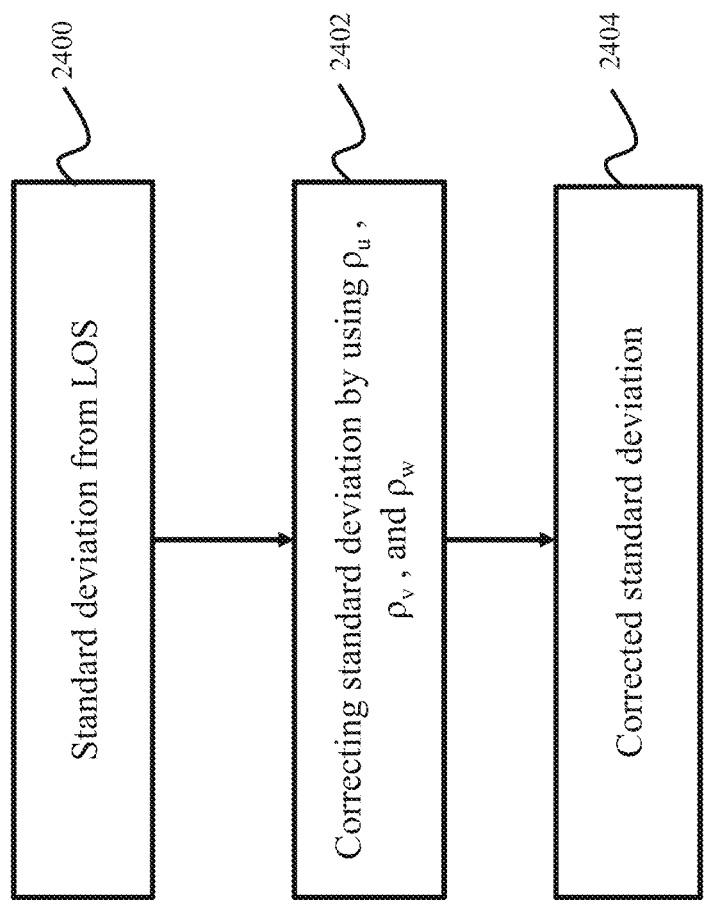
FIG. 24A shows a schematic for correction of standard deviation using auto-correlation functions, according to an embodiment.

FIG. 24A shows a schematic for correction of standard deviation using auto-correlation functions. Some embodiments are based on recognition that the correction function can be used to correct the unbiased horizontal velocities before estimating the turbulence. The correction function is trained offline i.e. in advance. According to an embodiment, the correction function is applied on the determined turbulence to obtain actual turbulence. The 'correction function' and 'autocorrelation function' are used interchangeably and would mean the same.

According to an embodiment, actual variance of u and v can be given as $$\overline{u'^2} = \frac{2}{(1+\rho_u)}\overline{u'_{DBS}}^2 - \frac{(1-\rho_w)\sin^2\phi}{(1+\rho_u)\cos^2\phi}\overline{\omega'^2} \quad \text{Equation 25}$$

$$\overline{v'^2} = \frac{2}{(1+\rho_v)}\overline{v'_{DBS}}^2 - \frac{(1-\rho_w)\sin^2\phi}{(1+\rho_v)\cos^2\phi}\overline{\omega'^2} \quad \text{Equation 26}$$

where $\rho_u$, $\rho_v$, $\rho_w$ are the autocorrelation functions (ACF), and $\overline{u'_{DBS}}^2$ and $\overline{v'_{DBS}}^2$ are obtained from the LiDAR measurements. The equations (25) and (26) may be referred to as correction equations.

Some embodiments based on recognition that autocorrelation function is based on physics-informed machine learning and can be used for correction of standard deviation of the horizontal velocity using the anemometer measurements. Some embodiments are based on recognition that the anemometer (such as, sonic anemometer) and the LiDAR measurements can be used to train the autocorrelation functions. $\overline{u'^2}$ and $\overline{v'^2}$ are determined from the anemometer (ground truth) and, further, the determined values of $\overline{u'^2}$ and $\overline{v'^2}$ are compared with the LiDAR measurements to estimate the ACF.

Figure 24B:
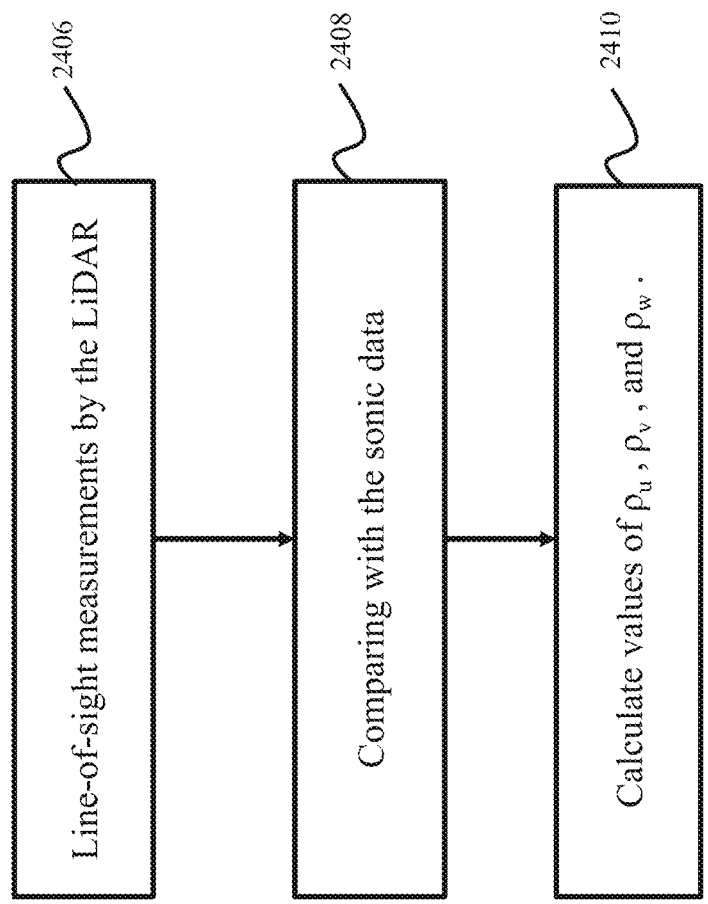
FIG. 24B shows a schematic for calculating values of the autocorrelation functions $\rho_u$, $\rho_v$, and $\rho_w$, according to some embodiments based on comparison with cup anemometer data.

FIG. 24B shows a schematic for calculating values of the autocorrelation functions $\rho_u$, $\rho_v$, and $\rho_w$, according to some embodiments based on comparison with cup anemometer data. The sonic anemometers are used to simulate measurement technique used by the LiDAR 2406. For example, two sonic anemometers are arranged approximately 11.5 m apart on opposite booms at each measurement height. Sonic data is projected into the directions of the LiDAR beam positions. The projected data from south sonic are shifted forward in time by 2 s to simulate time that the LiDAR beam takes to move from one side of the scanning circle to the other. Based on the time-shifted and the projected data i.e. sonic data 2408, the values of the autocorrelation functions $\rho_u$, $\rho_v$, and $\rho_w$, are calculated 2410.

According to an embodiment, mean values of $\rho_u$, $\rho_v$, and $\rho_w$ are calculated from the sonic data. For example, in a scenario, the mean values of the $\rho_u$, $\rho_v$, and $\rho_w$, under unstable conditions may correspond to 0.96, 0.81, and 0.66, respectively. Under stable conditions, the mean values of $\rho_u$, $\rho_v$, and $\rho_w$, may correspond to 0.95, 0.71, and 0.69. These values indicate that the u, v, and w wind components change significantly in both space and time. In particular, the values of w indicate that the values of w become decorrelated more quickly than values of u and v as a result of presence of smaller turbulent scales of motion in the vertical direction.

Further, the mean values of $\rho_u$, $\rho_v$, and $\rho_w$ calculated from the sonic data are used with equations. (25) and (26) to correct the LiDAR variance values, where the value of $\overline{w'^2}$ in the correction equations is considered as the velocity variance measured by the LiDAR vertical beam. The variance correction does not significantly change variance values under stable conditions, when the value of $\overline{w'^2}$ is small, but it reduces values of estimates of $\overline{u'^2}$ and $\overline{v'^2}$ by over 20% under unstable conditions, resulting in the values of the estimates closer to the values measured by the anemometers.

Some other embodiments are based on recognition that the values of the autocorrelation functions can be calculated by using a least-squares approach. Such embodiments yield similar values of $\rho_u$ and $\rho_v$ to the values calculated from the sonic data and much lower values of $\rho_w$ in comparison to the sonic values.

According to some embodiments, the ACF can be trained considering the actual terrain. Additionally, in an alternate embodiment, the ACF is trained for the terrain approximated with the set of convex shapes. In another embodiment, the ACF is trained considering the actual terrain and can be applied during online estimation of the turbulence using the terrain approximation with the set of convex shapes, to obtain the actual turbulence.

Figure 24C:
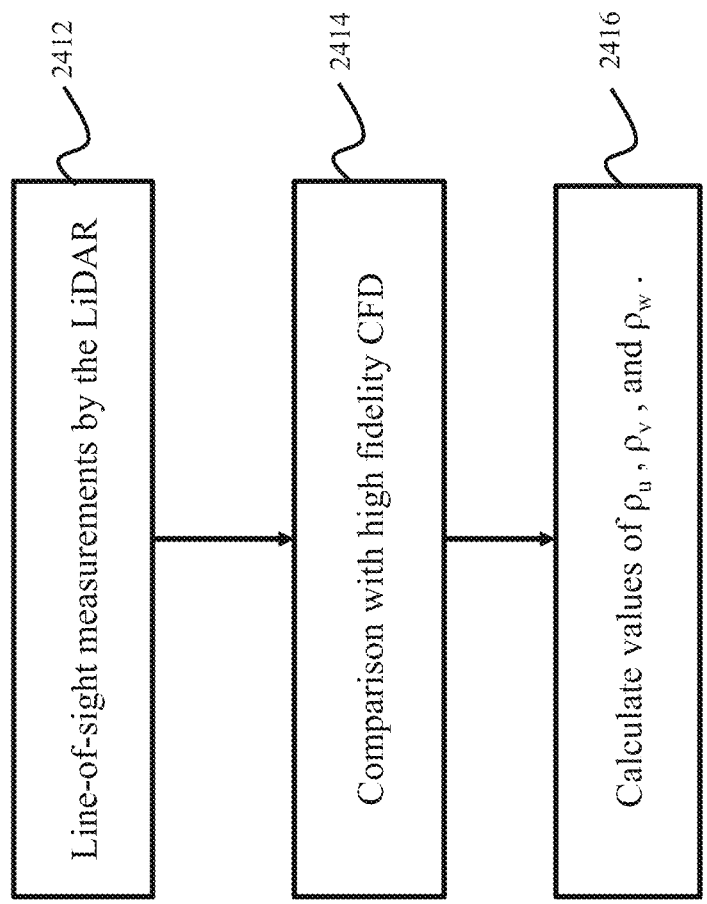
FIG. 24C shows a schematic for calculating values of the autocorrelation functions $\rho_u$, $\rho_v$, and $\rho_w$, according to some embodiments based on comparison with high fidelity CFD simulation.

FIG. 24C shows a schematic for calculating values of the autocorrelation functions $\rho_u$, $\rho_v$, and $\rho_w$, according to some embodiments based on comparison with high fidelity CFD simulation. The high fidelity CFD simulations are based on data assimilations and are used to simulate measurement technique used by the LiDAR 2412. The high fidelity simulation can be performed, for example, by using the large-eddy simulation (LES) solver within the Simulator for On/Offshore Wind Energy (SOWFA) built upon the Open-source Field Operations And Manipulations (OpenFOAM) computational fluid dynamics (CFD) toolbox. The solver is incompressible and uses the unstructured finite-volume formulation. Buoyancy effects are included through a Boussinesq buoyancy forcing term. Turbines are modelled with actuator lines. The LOS data from high fidelity simulation is then compared 2414 with the output of LiDAR and the values of the autocorrelation functions $\rho_u$, $\rho_v$, and $\rho_w$, are calculated 2416 such that the difference between the LiDAR measurement and CFD simulation is minimal. In other words, a least square problem is solved to evaluate the auto-correlation function values.

Alternatively, such values can be determined by mapping either the anemometer data or the high fidelity simulation data to the standard deviation of horizontal velocity extracted from LOS data and fit the auto correlation function in equations 25 and 26.

Figure 25:
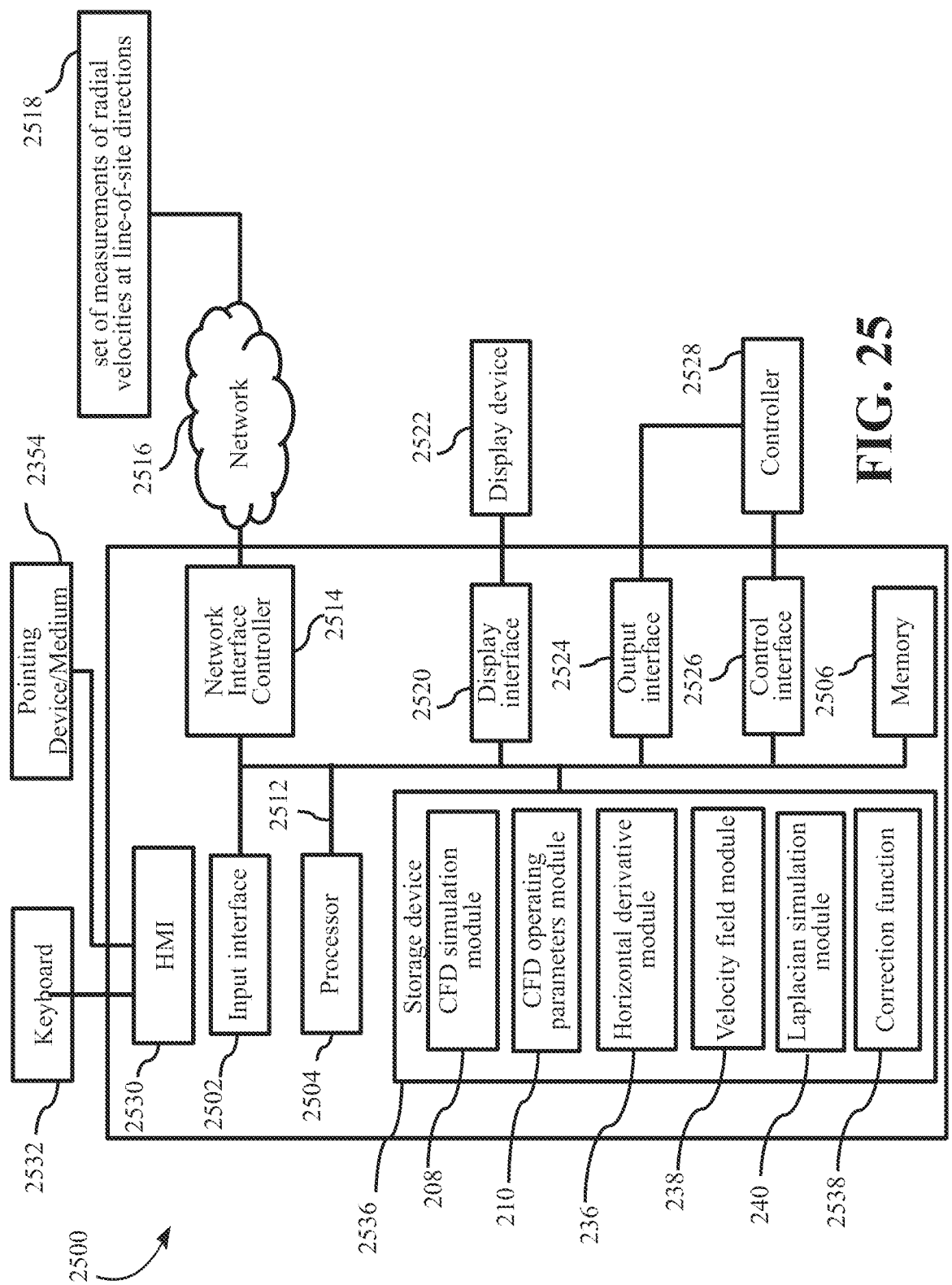
FIG. 25 shows a block diagram of a wind flow sensing system for determining turbulence of the wind flow, according to some embodiments.

FIG. 25 shows a block diagram of a wind flow sensing system 2500 for determining the turbulence of the wind flow, according to some embodiments. The wind flow sensing system 2500 includes an input interface 2502 to receive a set of measurements 2518 of the radial velocities at the line-of-site directions for each of the altitudes for a set of time steps. In some embodiments, the measurements 2518 are measured by the remote sensing instrument, such as a ground-based LiDAR, on a cone. The wind flow sensing system 2500 can have a number of interfaces connecting the system 2500 with other systems and devices. For example, a network interface controller (NIC) 2514 is adapted to connect the wind flow sensing system 2500, through a bus 2512, to a network 2516 connecting the wind flow sensing system 2500 with the remote sensing instrument configured to measure the radial velocities of the wind flow for each time step. Through the network 2516, either wirelessly or through wires, the wind flow sensing system 2500 receives the set of measurements 2518 of the radial velocities at the line-of-site directions for each of the altitudes for the set of time steps.

Further, in some embodiments, through the network 2516, the measurements 2518 can be downloaded and stored within a storage system 2536 for further processing. Additionally, or alternatively, in some implementations, the wind flow sensing system 2500 includes a human machine interface 2530 that connects a processor 2504 to a keyboard 2532 and pointing device 2534, wherein the pointing device 2534 can include a mouse, trackball, touchpad, joy stick, pointing stick, stylus, or touchscreen, among others.

The wind flow sensing system 2500 includes the processor 2504 configured to execute stored instructions, as well as a memory 2606 that stores instructions that are executable by the processor 2504. The processor 2504 can be a single core processor, a multi-core processor, a computing cluster, or any number of other configurations. The memory 2506 can include random access memory (RAM), read only memory (ROM), flash memory, or any other suitable memory systems. The processor 2504 is connected through the bus 2512 to one or more input and output interfaces and/or devices.

According to some embodiments, the instructions stored in the memory 2506 implement a method for determining the turbulence of the wind flow at a set of different altitudes from the set of measurements 2518 of the radial velocities at each of the altitudes for the set of time steps. To that end, the storage device 2536 can be adapted to store different modules storing executable instructions for the processor 204. The storage device 2536 stores the CFD simulation module 208, the CFD operating parameters module 210, the horizontal derivative module 236, the velocity field module 238 and the Laplacian simulation module 240. These modules are explained in description of FIG. 2. Further, the storage device 2536 stores a correction function 2538 trained to reduce a difference between the ground truth and the determined unbiased horizontal velocities to correct the unbiased horizontal velocities. The storage device 2536 can be implemented using a hard drive, an optical drive, a thumb drive, an array of drives, or any combinations thereof.

The processor 2504 is configured to estimate the unbiased horizontal velocities at each of the altitudes and for each time step as the horizontal projection of the corresponding radial velocities that are corrected with corresponding horizontal derivatives of vertical velocities of the estimated velocity fields determined for the corresponding time step. Further, the processor 2504 is configured to determine, at each of the altitudes, the average of the unbiased horizontal velocities for the period of time including the set of time steps, and, subsequently, determine the turbulence based on the unbiased horizontal velocities for each time step and the average of the unbiased horizontal velocity. According to an embodiment, the period of time is multiple of 10 minutes and difference between time steps is multiple of a second.

The wind flow sensing system 2500 includes an output interface 2524 render the turbulence at each of the altitudes. Additionally, the wind flow sensing system 2500 can be linked through the bus 2512 to a display interface 2520 adapted to connect the wind flow sensing system 2500 to a display device 2522, wherein the display device 2522 may be a computer monitor, camera, television, projector, or mobile device, among others. Additionally, the wind flow sensing system 2500 includes a control interface 2526 configured to submit the estimated turbulence at each of the altitudes to a controller 2528 which is integrated with a machine, such as wind turbine. According to an embodiment, the controller 2528 is configured to operate the machine, based on the estimated turbulence at each of the altitudes.

Figure 26:
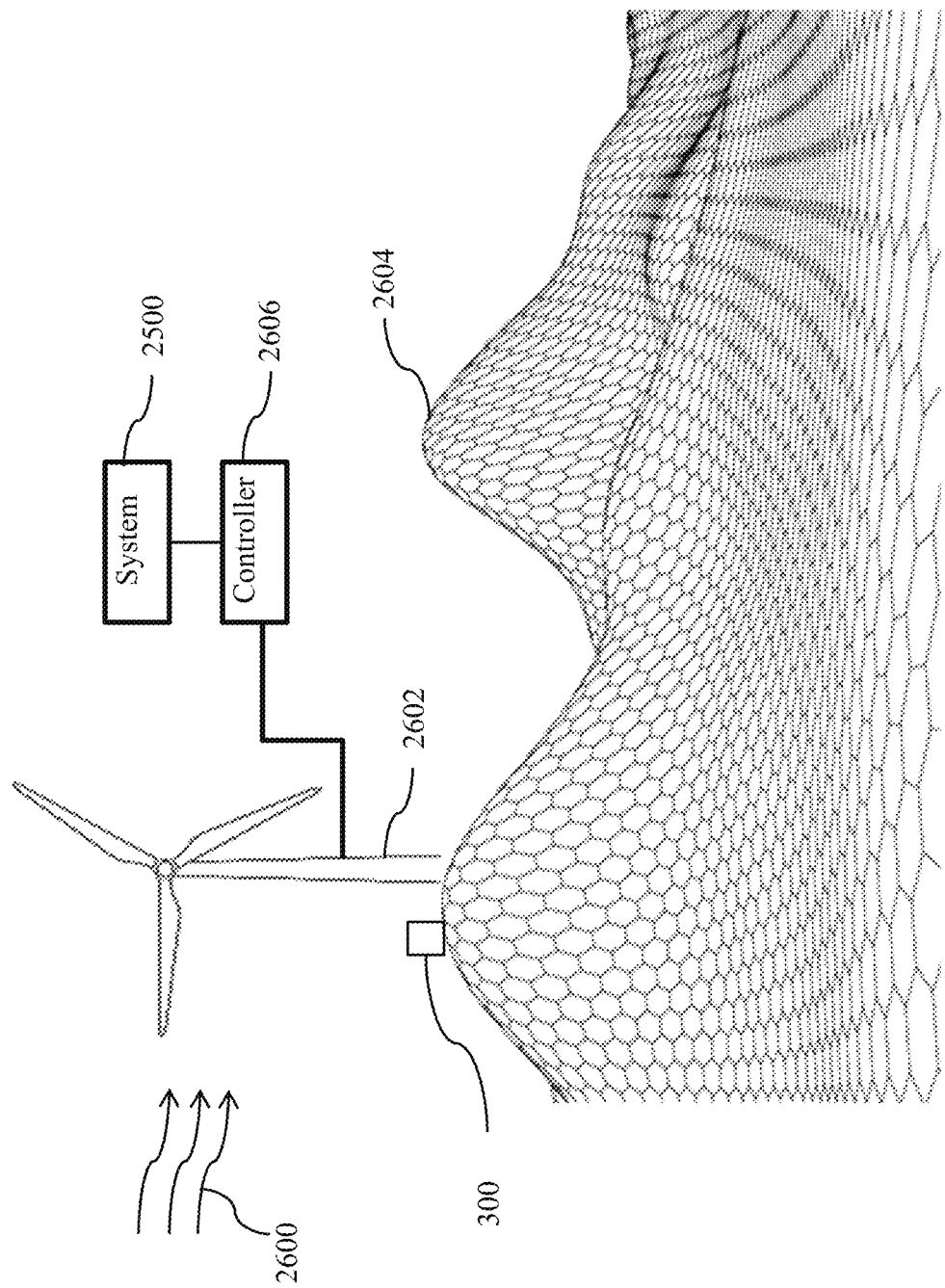
FIG. 26 shows a schematic of a wind turbine including a controller in communication with a system employing principles of some embodiments.

FIG. 26 shows a schematic of a wind turbine 2602 including a controller 2606 in communication with the system 2500 employing principles of some embodiments. The wind turbine 2602 on a complex terrain 2604 is integrated with the system 2500. The wind turbine 2602 may be equipped with a transceiver enabling communication capabilities of the controller 2606 of the wind turbine, through wired or wireless communication channels, with the system 2500. For example, through the transceiver, the controller 2406 receives estimation of wind parameters from the system 2500.

The LiDAR 300 measures the LOS velocities of wind 2600 flowing over the complex terrain 2604 and blades of the wind turbine 2602, for each of the altitudes for the set of time steps. The system 2500 receives the LiDAR measurements (as described in FIG. 25). Based on the received LiDAR measurements, the system 2500 estimates the unbiased horizontal velocities of the wind flow 2600 at each of the altitudes and for each time step. Further, the system 2500 estimates turbulence quantities of the wind flow 2600, such as the turbulence intensity and turbulence kinetic energy. The system 2500 submits the estimated horizontal velocities and the turbulence quantities to the controller 2606. The controller 2606 generates control inputs, based on estimated horizontal velocities and the turbulence quantities, for controlling the wind turbine 2602.

For example, the horizontal velocity and the turbulence greater than a threshold results in irregular wind loading on the wind turbine 2602. Operating the wind turbine 2602 under such conditions can affect both energy production as well as structure of the blades of the wind turbine 2602. In cases, the estimated horizontal velocity or turbulence is greater than the threshold, the controller 2606 generates the control inputs which results in halting or braking of the wind turbine 2602. By this, undesirable effects of the irregular wind on the wind turbine 2602 are prevented. Additionally, the controller 2606 can actuate the wind turbine 2602 based to the estimated horizontal velocity, instead of actuating the wind turbine arbitrarily. Alternatively, the controller 2606 can actuate the wind turbine 2602 according to both the estimated horizontal velocity and turbulence. Thereby, the energy production of the wind turbine 2602 is increased, and the wind loads experienced by the wind turbine 2602 is reduced, which in turn extends the turbine 2602 lifespan.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A wind flow sensing system for determining wind flow at a set of different altitudes above a terrain having a complex shape from a set of measurements of radial velocities at each of the altitudes, comprising:

an input interface configured to receive the set of measurements of radial velocities at line-of-site points above the terrain for each of the altitudes;
a processor configured to estimate velocity fields for each of the altitudes based on data assimilation of the velocity fields above an approximation of the shape of the terrain with a set of one or multiple convex shapes to fit the measurements of radial velocities, and estimate horizontal velocities at each of the altitudes as a horizontal projection of the corresponding radial velocities corrected with corresponding horizontal derivatives of vertical velocities of the estimated velocity fields, wherein the measurements of the radial velocities are measured by a ground-based LiDAR on a cone, such that for each altitude, the measurements on the cone are measurements on a circle including multiple measurements of the radial velocities in different angular directions measured at different line-of-site points on a circumference of the circle and one measurement of the radial velocity in a vertical direction measured at a center of the circle; and
an output interface configured to render the estimated horizontal velocities at each of the altitudes.

2. The wind flow sensing system of claim 1, wherein the set of convex shapes includes at least two cylinders of different diameters.

3. The wind flow sensing system of claim 1, wherein the data assimilation performs a multi-variable search over a combination of boundary conditions defined by values of inlet velocity field and a dimension of a convex shape in the set of convex shapes.

4. The wind flow sensing system of claim 3, wherein the convex shape is a cylinder and the multi-variable search determines values of the inlet velocity field and radius of the convex shape resulting in the measurements of the radial velocities according to dynamics of the wind flow.

5. The wind flow sensing system of claim 4, wherein the data assimilation is performed by solving multiple Laplacian equations, and wherein each of the Laplacian equations defines dynamics of the wind flow for specific values of the inlet velocity field and the radius of the convex shape.

6. The wind flow sensing system of claim 1, wherein the processor is configured to estimate the velocity fields by applying a mapping function to the velocity fields determined by the data assimilation.

7. The wind flow sensing system of claim 6, wherein the mapping function is a neural network trained to minimize a difference between velocity fields determined for the non-convex terrains and their approximations with convex shapes.

8. The wind flow sensing system of claim 1, wherein the horizontal derivatives of the vertical velocities at each of the altitudes defines a gradient of the vertical velocity at the center of the circle of the cone defining the measurements of the LiDAR for the corresponding altitude.

9. The sensing system of claim 1, wherein the velocity fields for each of the altitudes include values of velocity of the wind inside and outside of the cone.

10. The wind sensing system of claim 1, further comprising a controller of a wind turbine to control the wind turbine based on the estimated horizontal velocities at each of the altitudes, wherein the wind turbine is operatively connected to the wind flow sensing system of claim 1.

11. A wind flow sensing method for determining wind flow at a set of different altitudes above a terrain having a complex shape from a set of measurements of radial velocities at each of the altitudes, wherein the method uses a processor coupled with stored instructions implementing the method, wherein the instructions, when executed by the processor carry out steps of the method, comprising:

receiving the set of measurements of radial velocities at line-of-site points above the terrain for each of the altitudes;

estimating velocity fields for each of the altitudes based on data assimilation of the velocity fields above an approximation of the shape of the terrain with a set of one or multiple convex shapes to fit the measurements of radial velocities;

estimating horizontal velocities at each of the altitudes as a horizontal projection of the corresponding radial velocities corrected with corresponding horizontal derivatives of vertical velocities of the estimated velocity fields, wherein the measurements of the radial velocities are measured by a ground-based LiDAR on a cone, such that for each altitude, the measurements on the cone are measurements on a circle including multiple measurements of the radial velocities in different angular directions measured at different line-of-site points on a circumference of the circle and one measurement of the radial velocity in a vertical direction measured at a center of the circle; and outputting the estimated horizontal velocities at each of the altitudes.

12. The wind flow sensing method of claim 11, wherein the set of convex shapes includes at least two cylinders of different diameters.

13. The wind flow sensing method of claim 11, wherein the horizontal derivatives of the vertical velocities at each of the altitudes defines a gradient of the vertical velocity at the center of the circle of the cone defining the measurements of the LiDAR for the corresponding altitude.

* * * * *